United States Patent [19]
Okabe et al.

[11] Patent Number: 5,301,178
[45] Date of Patent: Apr. 5, 1994

[54] DRIVE UNIT FOR OPTICAL MEMORY DEVICE WITH PORTION OF DRIVE MEANS MOUNTED OUTSIDE A SEALING MEANS

[75] Inventors: Satoshi Okabe, Hachioji; Sunao Aoki, Higashimurayama, both of Japan

[73] Assignee: Olypus Optical Co., Ltd., Tokyo, Japan

[21] Appl. No.: 657,690

[22] Filed: Feb. 19, 1991

[30] Foreign Application Priority Data

Feb. 22, 1990 [JP] Japan .................. 2-41833
Apr. 11, 1990 [JP] Japan .................. 2-94106
May 23, 1990 [JP] Japan .................. 2-131129

[51] Int. Cl.⁵ .................................. G11B 33/14
[52] U.S. Cl. ...................... 369/77.1; 360/97.02
[58] Field of Search ............... 369/75.1, 75.2, 77.1, 369/77.2; 360/97.02

[56] References Cited

U.S. PATENT DOCUMENTS

| | | | |
|---|---|---|---|
| 3,912,278 | 10/1975 | Teutsch | 360/97.02 X |
| 4,112,471 | 9/1978 | Pollard et al. | 360/97.02 |
| 4,194,225 | 3/1980 | Hasler | 360/97.02 X |
| 4,337,491 | 6/1982 | Hasler et al. | 360/97.02 |
| 4,604,665 | 8/1986 | Müller et al. | 360/97.02 X |
| 5,086,422 | 2/1992 | Hagiya et al. | 369/75.1 |

FOREIGN PATENT DOCUMENTS

| | | |
|---|---|---|
| 58-97701 | 7/1983 | Japan . |
| 60-93665 | 5/1985 | Japan . |
| 63-40857 | 3/1988 | Japan . |
| 63-259864 | 10/1988 | Japan . |
| 64-43888 | 2/1989 | Japan . |
| 1-118283 | 5/1989 | Japan . |
| 2-192061 | 7/1990 | Japan . |

*Primary Examiner*—Eugene R. LaRoche
*Assistant Examiner*—Michael C. Kessell
*Attorney, Agent, or Firm*—Frishauf, Holtz, Goodman & Woodward

[57] ABSTRACT

A drive unit for use in an optical memory unit has a front panel, a drive mechanism, and sealing members. The front panel has an air vent and a slot for allowing passage of a cassette case containing a disk-shaped recording medium. The drive mechanism loads the cassette case through the slot and drive the recording medium in a specified direction in order to record and reproduce information on and from the recording medium. The sealing members seals the drive mechanism nearly completely, in order to prevent migration of the outside air into the drive mechanism as the air is introduced via the air vent.

5 Claims, 30 Drawing Sheets

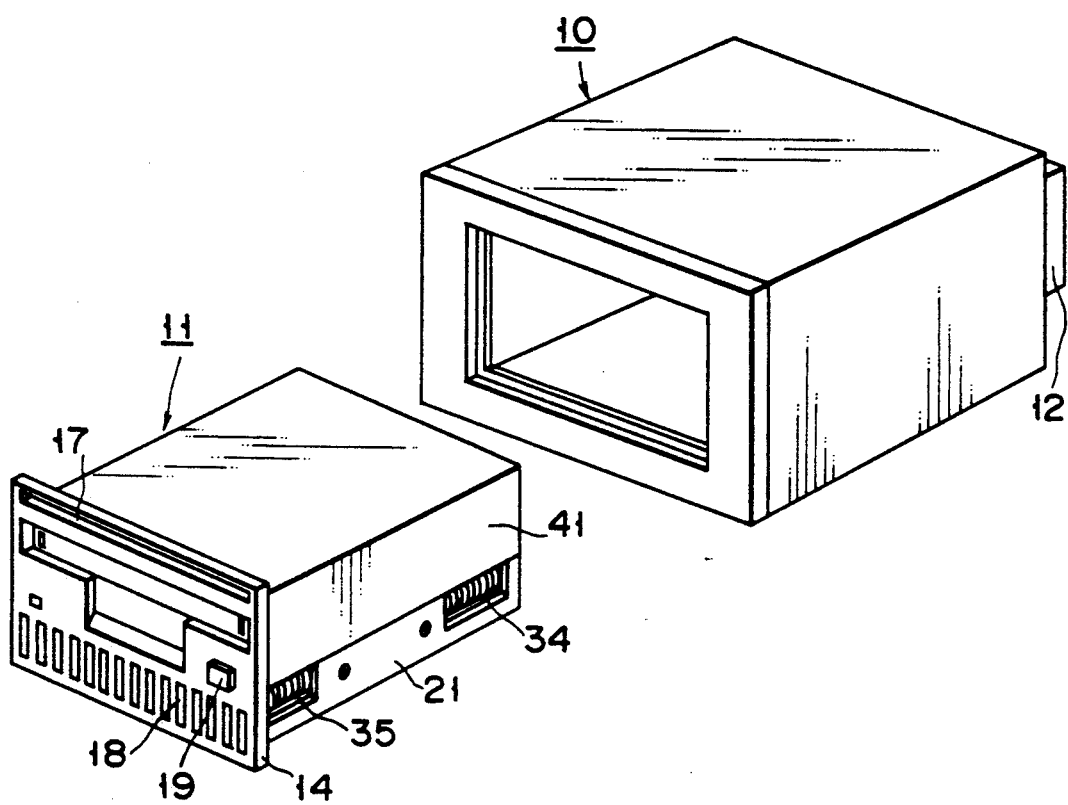
F I G. 4

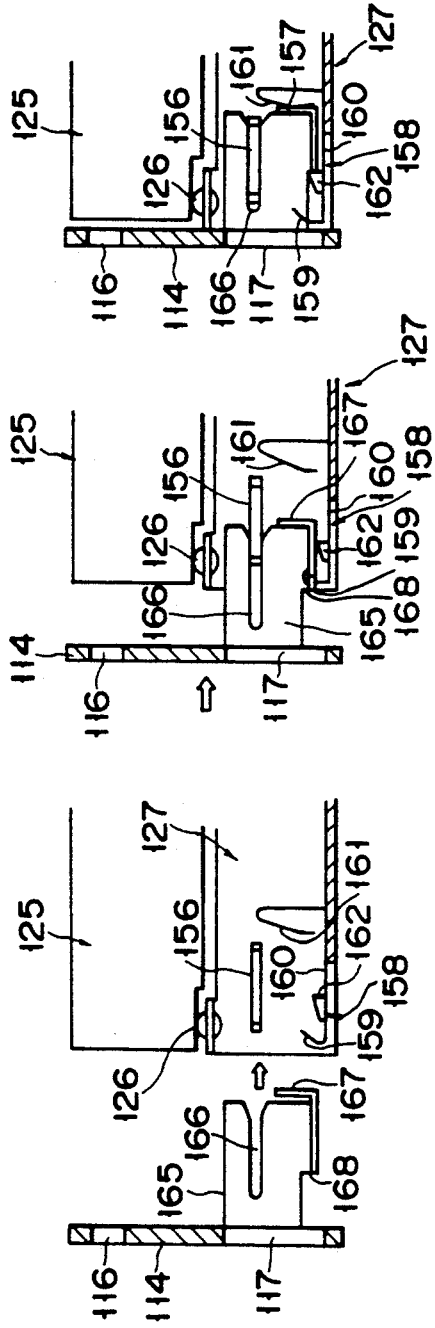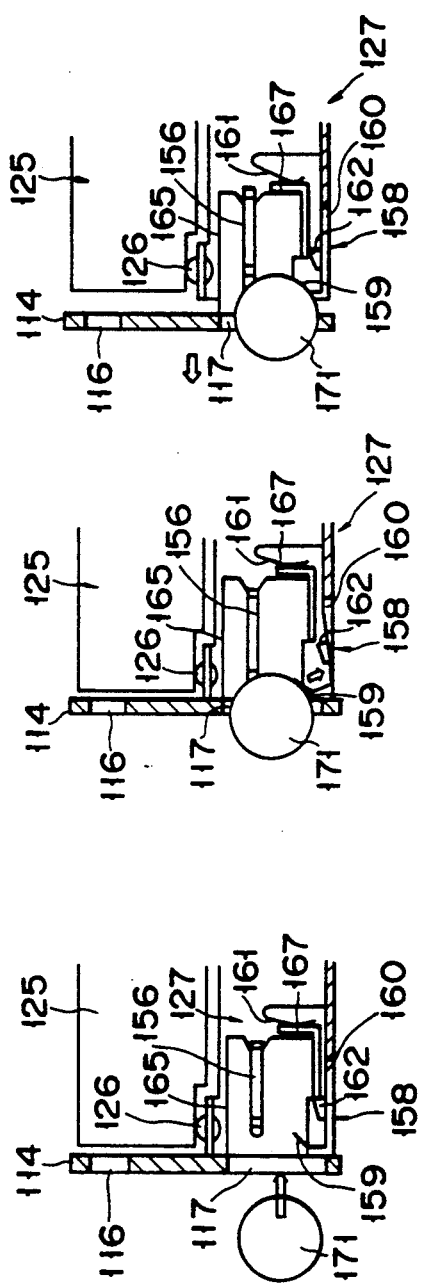

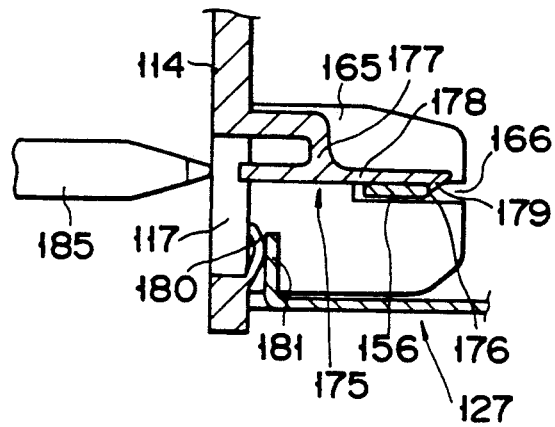
F I G. 18A
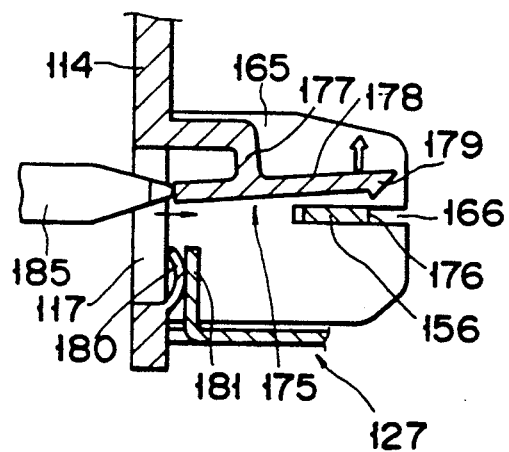
F I G. 18B

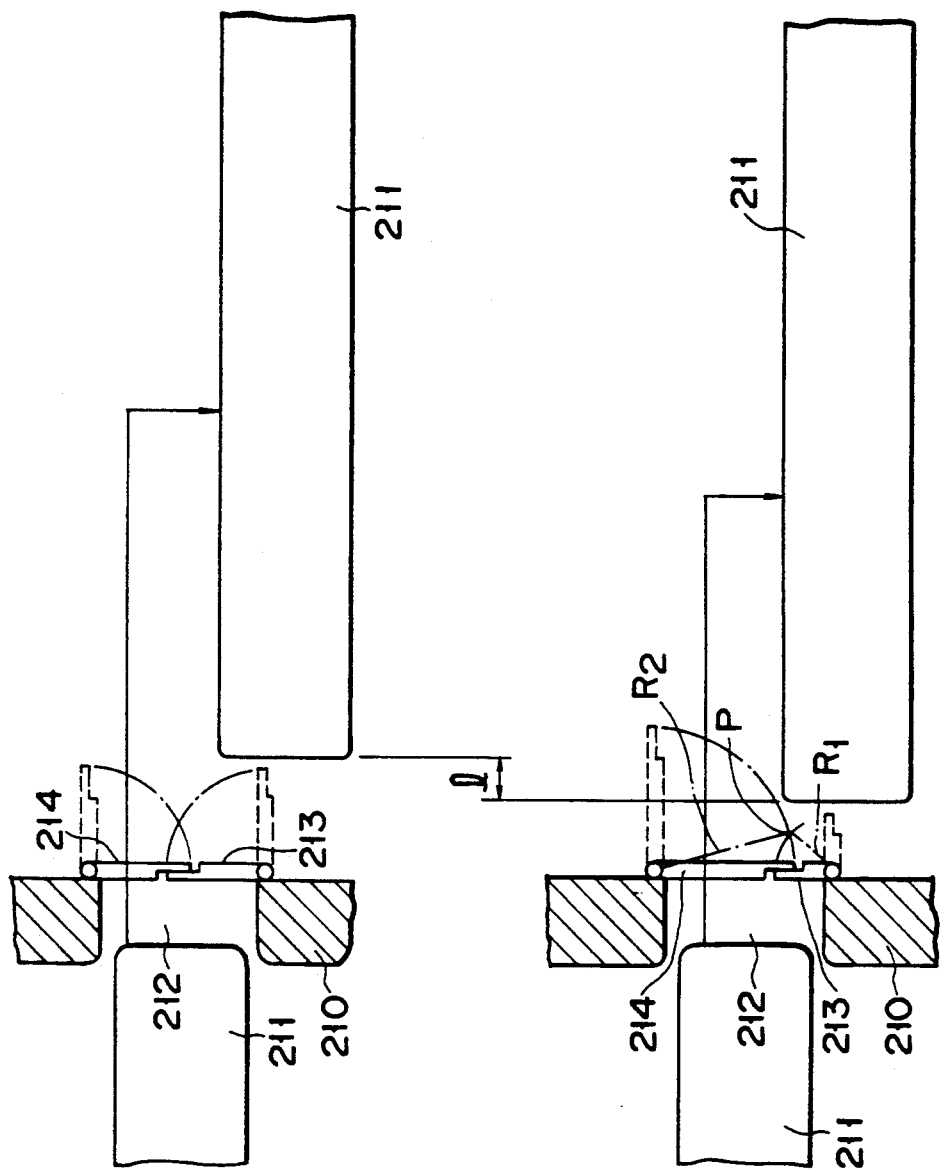

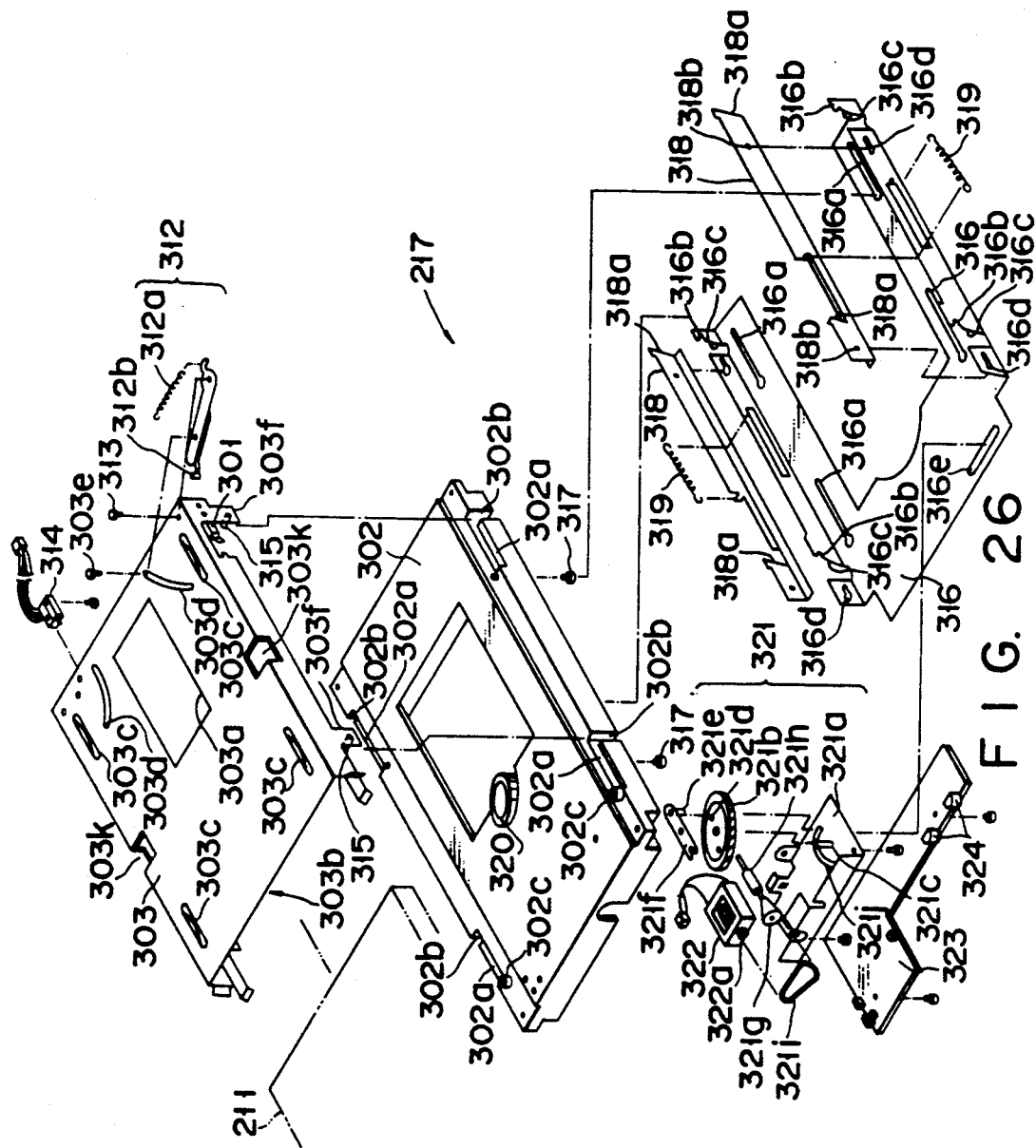

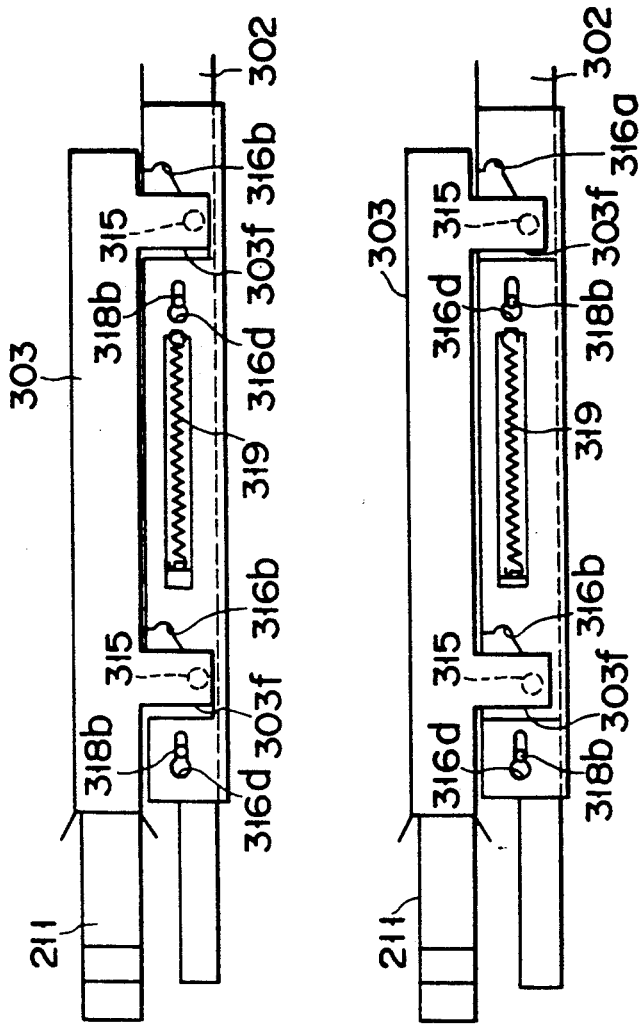

F I G. 28A
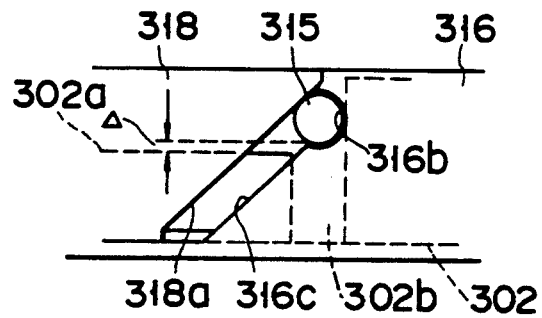
F I G. 28B
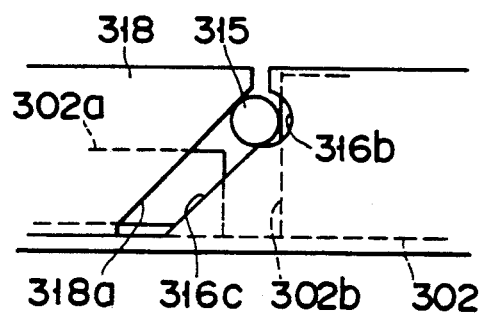
F I G. 28C
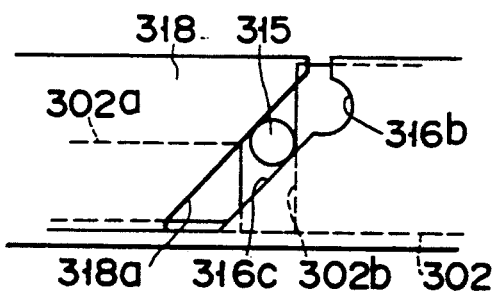
F I G. 28D
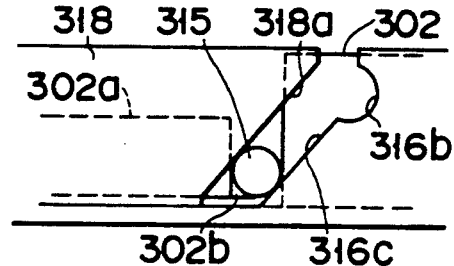

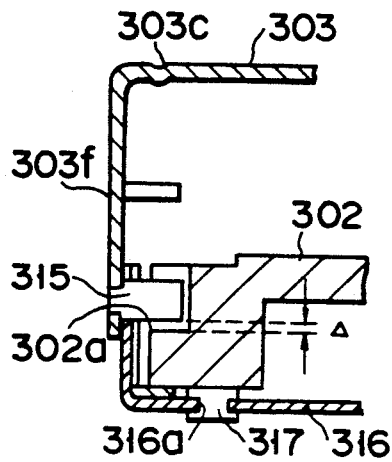
F I G. 29
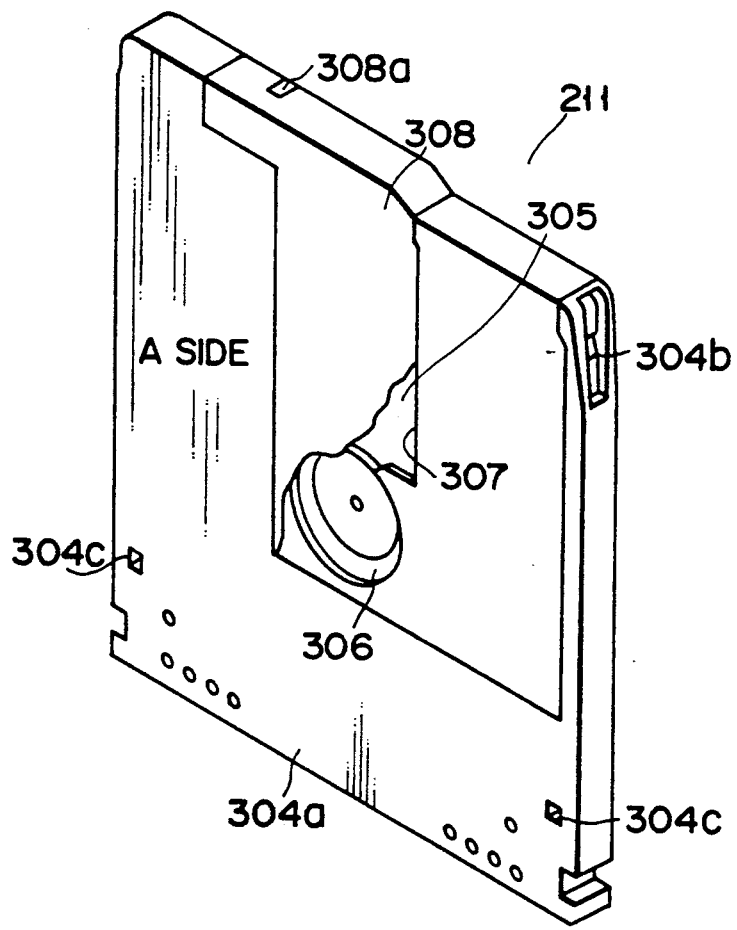
F I G. 30

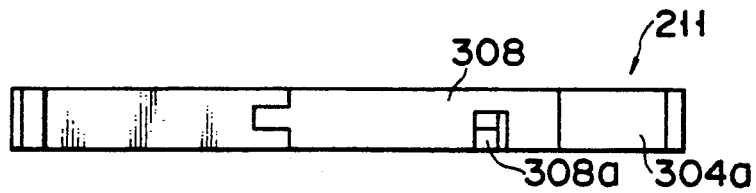
F I G. 31
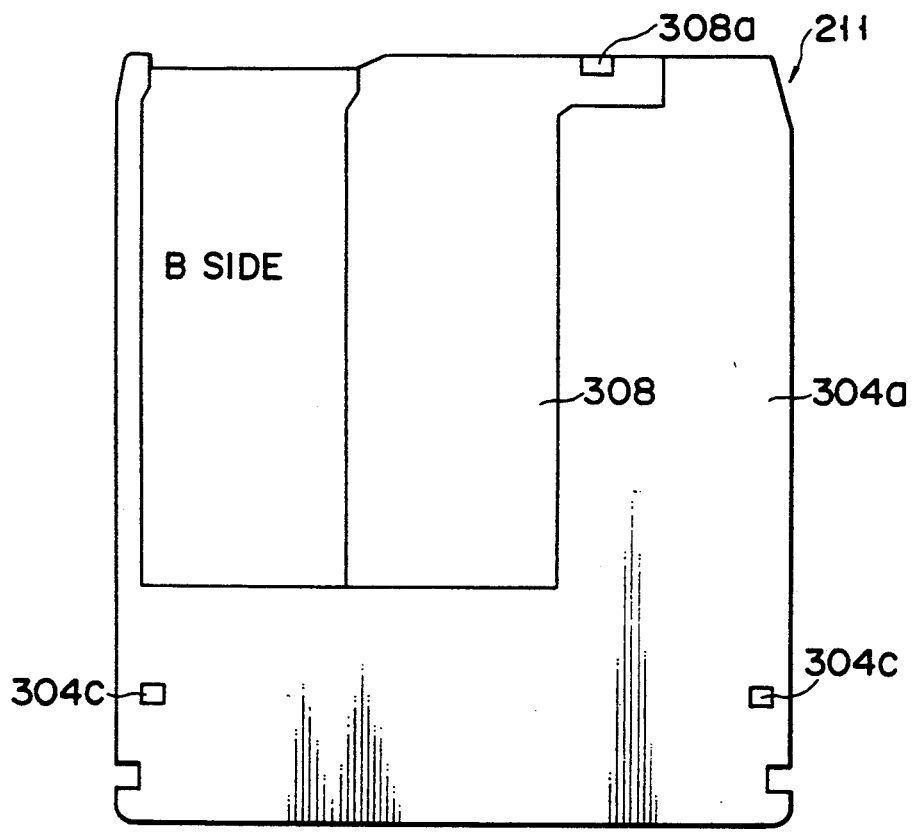
F I G. 32

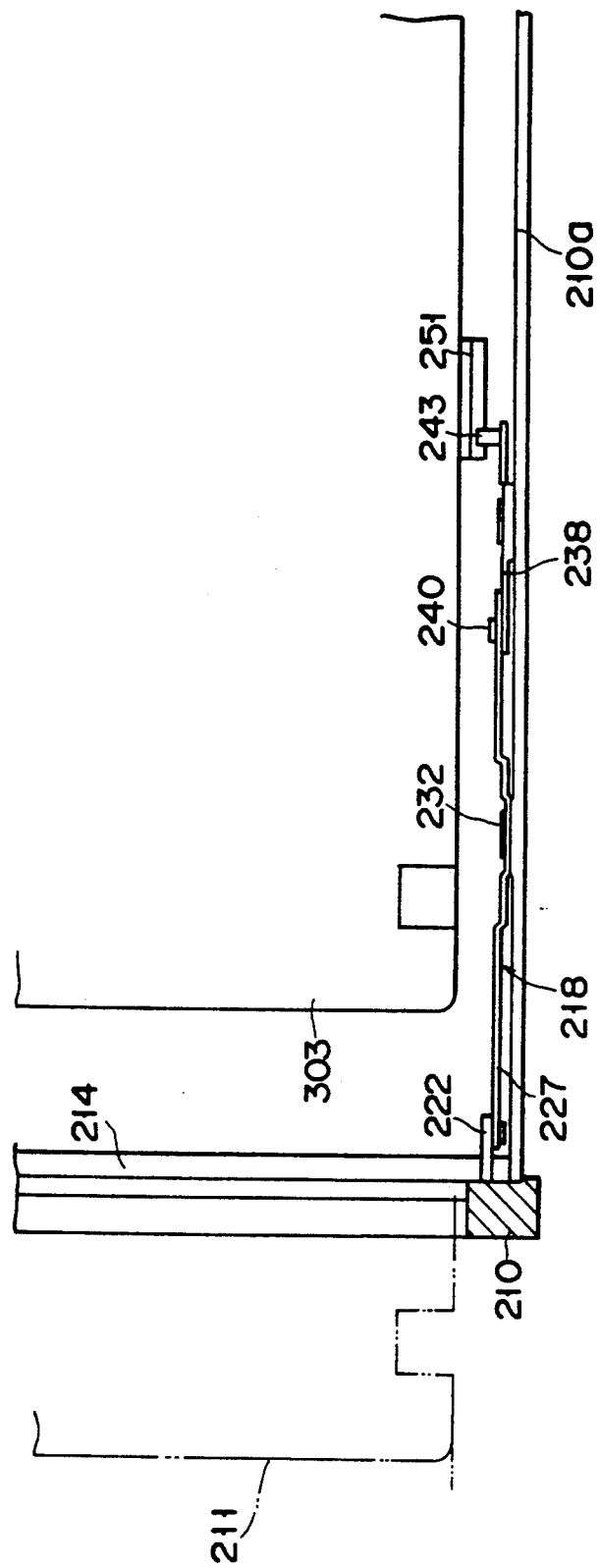
F I G. 34

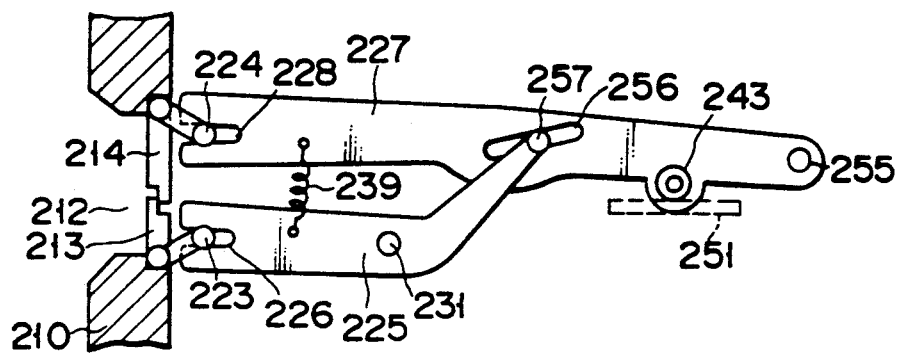
F I G. 37
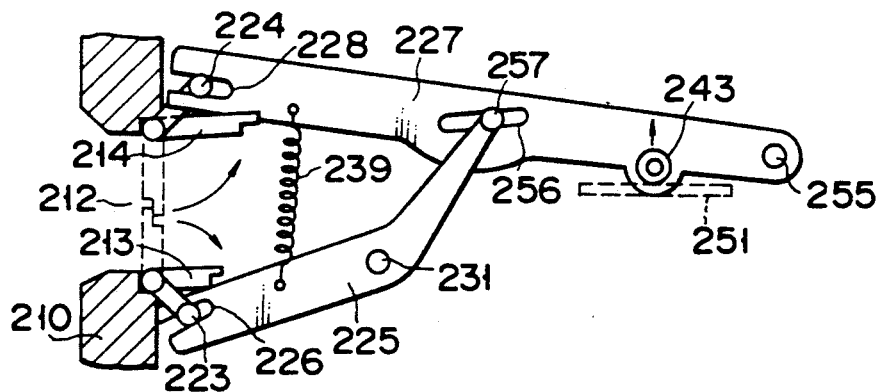
F I G. 38

DRIVE UNIT FOR OPTICAL MEMORY DEVICE WITH PORTION OF DRIVE MEANS MOUNTED OUTSIDE A SEALING MEANS

BACKGROUND OF THE INVENTION

1. Field of the Invention

The present invention relates to a drive unit for use in an optical memory device which records and/or reproduces information by using optical beam.

2. Description of the Related Art

In a conventional drive unit for use in an optical memory unit which uses optical disks or photoelectromagnetic disks, a front panel with a cassette slot is attached to a deck unit which has a spindle motor to rotate a disk, a pick-up to record/reproduce the information to the disk, a motor to drive the pick-up in the radial direction of the disk, and an automatic load/eject mechanism to load a cassette containing a disk into the deck unit through the cassette slot, and to unload the cassette from the deck unit through the cassette slot.

In order to improve the drive unit, various efforts have been made. For example, the Japanese Patent Unexamined Publication No. 64-43888 proposes a drive unit, in which the front surface having a cassette slot is provided with an air vent. To the air vent air is supplied by a cooling fan from the slot via the back surface of a cassette case thereby to lower the temperature in the device unit.

In the conventional drive unit as mentioned above, since the back surface of the cassette case is used as a part of the air passage, the dust entering from the outside adheres to the disk in the cassette case, and also to the various optical components of an optical head. The dust decreases the quantity of light, making it difficult to record or reproduce information accurately or stably.

To solve this problem, a high-performance filter with high dust collecting efficiency can be installed the air vent, through which the outside air is admitted, for collecting dust so that the drive unit can be cooled with clean air. However, the filter causes a pressure loss of air, requiring a large-capacity cooling fan. The use of a high-performance filter will result in high costs. As the filter is used over an extended period of time, the cooling air volume reduces due to filter clogging, increasing the possibility of a temperature rise in the drive unit. Consequently, the filter must be replaced by a new one, periodically or as required according to filter condition. This makes it difficult to design a drive unit which needs no maintenance for long time (for example, over 5 years).

However, similar adhesion of dust to disks and optical parts generally occurs even in the unit whose interior is naturally cooled through the vent without using a cooling fan.

In order to remove a cassette, which is held in the deck unit due to power failure or trouble in the eject mechanism, a manual eject mechanism such as a manual rotating means is installed to manually rotate an eject motor, as is disclosed in Published Unexamined Japanese Utility Model Application No. 63-40857.

However, in the conventional drive unit having a manual eject mechanism, the front panel is fixed to the deck-unit holding frame with screws or with pressure-sensitive, double coated adhesive tape. Consequently, in the case where the control section of the manual eject mechanism is located inside the front panel, it is hard and time-consuming to remove the front panel. Hence, it is impossible to unload a cassette immediately from the deck unit in case of power failure or trouble of the eject mechanism. The front panel may easily be broken during the removal of the cassette.

To solve these problems, an opening can be formed in the front panel, to operate the control section from the outside. This, however, jeopardizes the outer appearance of the product.

As described above, a slot is made in the front panel of the drive unit, to insert a cassette or a cartridge into the drive unit. In addition, a front cover is used to close the slot, thereby to prevent the entry of dust into the unit.

For example, in the information processor disclosed in Published Unexamined Japanese Patent Application No. 63-259864 or Published Unexamined Japanese Patent Application No. 60-93665, the slot is opened and closed with one front cover. The front cover rotatably opens to the inside when a cartridge is inserted into the slot and when the cartridge is set in the unit, the front cover completely closes the slot. When the cartridge is ejected, the front cover rotatably opens to the inside, as the eject mechanism function.

However, to open and close the slot, the front cover needs to rotate, occupying a large space for the motion. Hence, a wasteful space must be left in the unit, increasing the size of the unit.

Therefore, in an attempt to minimize the space required to allow the front cover to rotate, in the unit disclosed in Published Unexamined Japanese Patent Application No. 1-118283, two front covers of equal rotation radius are installed at the top and the bottom, respectively, of the slot, forming a folding door. The case of this folding door can reduce the space required to open and close the front cover.

However, since the two front covers have the same rotation radius, the tip ends of the front covers may bump into each other or overlap reversely to fail to achieve proper closing of the slot. Consequently, in the unit disclosed in Published Unexamined Japanese Patent Application No. 1-118283, the rotating phases of two front covers are varied by varying the number of teeth of front cover driving gears.

However, it is strongly demanded that an information processor like an optical disk unit be made smaller.

In the device disclosed in Published Unexamined Japanese Patent Application No. 1-118283, several gears are used to vary the rotating phases of two front covers as well as solenoids to drive these gears. This involves defects in that the configuration generally becomes complicated and the cost increases.

On the other hand, in the device disclosed in Published Unexamined Japanese Patent Application No. 60-93665, the front cover is rotated by a cam connected to a loading plate which moves in the horizontal direction only, during cartridge transportation. In the device disclosed in Published Unexamined Japanese Patent Application No. 63-259864, the front cover is rotated by a rotor which has a shaft extending parallel to the horizontal transportation direction. These front cover driving systems, are useless unless they have a specific transportation mechanism.

SUMMARY OF THE INVENTION

Therefore, the first object of the present invention is to provide a drive unit for use in an optical memory device, which can effectively prevent adhesion of dust to the recording medium or various optical components of an optical head and thus avoid a reduction in the quantity of light caused by dust adhesion, and which can therefore record and reproduce information accurately and stably over a long time.

The second object of the present invention is to provide a drive unit for use in an optical memory unit, which allows easy mounting and removal of a front panel by simple means.

The third object of the present invention is to provide a drive unit for use in an optical memory unit, which has a compact folding door system comprising front covers which are easy to open and close by means of a drive unit which can be applied to various cartridge transportation systems.

In order to achieve the first object, a drive unit for use in an optical memory unit, according to a first aspect of the present invention, comprises:

a front panel having an air vent and a slot to insert a cassette case containing a disk-form recording medium;

a drive mechanism for loading a cassette case to be inserted via the slot and rotatably driving the disk in a specified direction to record/reproduce the information on the disk-form recording medium; and a sealing means for nearly completely sealing the drive mechanism to prevent the entry of outside air into the drive mechanism when outside air is introduced via the vent.

In order to achieve the second object, a drive unit for use in an optical memory device, according to a second aspect of the present invention, comprises:

a main body having a lock releasing section having a protruding portion provided to allow for elastic displacement); and a front panel attached to the main body and having a latch adapted to engage with the slot to insert a recording medium with the protruding section of the lock releasing section, wherein in a first mode in which the front panel is locked to the main body, the protruding portion is engaged with the latch by the elastic force of the lock releasing section, while in a second mode in which the front panel is removed from the unit proper, the lock releasing section displaces against the elastic force to release the engagement between the protruding portion and the latch.

In order to achieve the third object, a drive unit for use in an optical memory device, according to a third aspect of the present invention, comprises:

a main body having a slot in front surface, for allowing passage of a medium cartridge into and from the main body; and front covers including a mechanism to seal-close the slot of the main body by the rotatable movement and to open and close the first and the second front covers and these front covers, respectively, wherein when the slot is seal-closed, the first front cover has its tip end located outside the main body, and the second front cover has its tip end located inside and its rotatably moving radius is greater than that of the first front cover.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3 and 4 are a sectional view and an exploded oblique view of a second embodiment of the drive unit according to the present invention respectively;

FIGS. 14A, B, C, 15A, B and C are diagrams, explaining the mounting and removal mechanism of the front panel, respectively;

FIGS. 18A and 18B are views explaining the mounting and removal mechanism of the front panel;

FIGS. 19A to 32 show an eighth embodiment of the present invention, and FIGS. 19A and 19B explain the operation of the front cover;

FIG. 20 is a side view of the cover-opening and -closing mechanism;

FIG. 21 is a plan view of the cover-opening and -closing mechanism;

FIGS. 22 to 25 are side views of the cover-opening and -closing mechanism, showing the operation procedure;

FIG. 26 is an exploded oblique view of the loading unit;

FIGS. 27A to 27E are views explaining the operation of the loading unit;

FIGS. 28A to 28D are views explaining the drive plate and the auxiliary plate during loading operation;

FIG. 29 is a cross-sectional view, taken along the line A—A in FIGS. 27A to 27E;

FIGS. 30, 31 and 32 are an oblique view, front view, and plan, respectively, of a cartridge;

FIGS. 33 and 34 are a side view and a plan, respectively, of the cover-opening and -closing mechanism according to a ninth embodiment of the present invention;

FIGS. 37 and 38 are a side view and a plan, respectively, of the cover-opening and -closing mechanism according to an eleventh embodiment of the present invention.

DETAILED DESCRIPTION OF THE PREFERRED EMBODIMENTS

Figure 1:
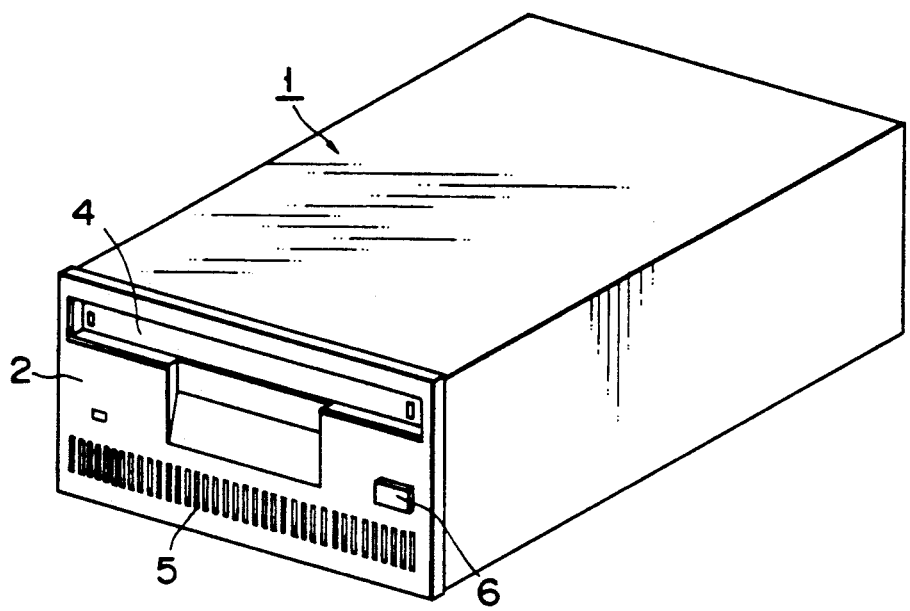
FIGS. 1 and 2 are a perspective view of a drive unit for use in an optical memory device according to a first embodiment of the present invention, and a sketch showing the inside of the drive unit respectively.

Referring now to the drawings, embodiments to the present invention will be described in detail.

Figure 2:
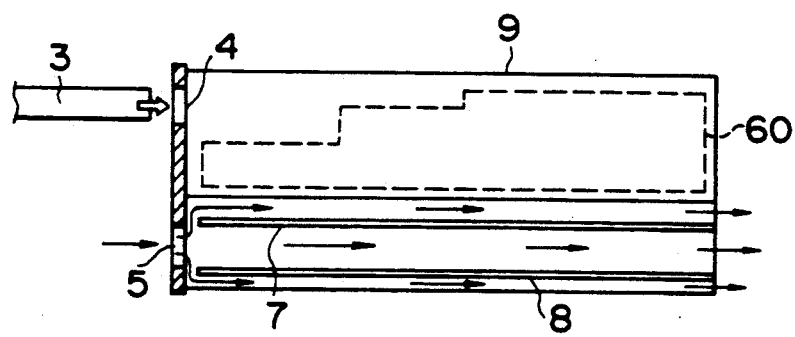

FIG. 1 shows a drive unit for use in an optical memory device according to the present invention. FIG. 2 is a schematic diagram showing the inside of the drive unit. A slot 4 is formed in the front surface 2 of the drive unit 1. Through the slot 4, a cassette case 3, which contains a disk-shaped recording medium, can be loaded into and unloaded from the unit. Provided below are: an air vent 5 consisting of lattice-form through-holes for ventilating the drive unit 1; and an eject switch 6 for ejecting the cassette case 3 from the drive unit 1 are provided.

Inside the drive unit, there are provided: a motor which rotates the disk in the loaded cassette case 3, an optical head which records and/or reproduces the information to the disk, a drive mechanism which drives the optical head in the radial direction of the disk, a loading mechanism which loads the cassette case 3, and in addition, in case of a photoelectro-magnetic disk, a drive mechanism 60 equipped with a bias magnetic field mechanism which gives the external magnetic field, and at the same time a power control of the semiconductor laser in the optical head, a processing circuit to read the information from the disk, a drive circuit board 7 which possesses a control circuit of the drive mechanism to drive the optical head in the disk radial direction, a main circuit to control the drive unit in accordance with the host command, and a controller circuit board 8 which possesses circuits to decode commands and correct errors.

In the drive unit 1, after the cassette case 3 is inserted through the slot 4 and loaded into the drive mechanism 60 by a loading mechanism, the disk is rotated by a motor. When the eject switch 6 is pressed, with the cassette case 3 loaded in the drive mechanism 60, the cassette case 3 is partly ejected from a slot 4 made in the front surface 2. An operator can therefore take out the cassette case from the drive unit manually.

In this embodiment, the motor to rotate the disk, the optical head, the drive mechanism to drive the optical head, loading mechanism, and the drive mechanism 60 having a bias magnetic field mechanism if the disk is a photoelectro-magnetic one, are completely sealed with the dust-tight cover 9 in a manner to allow the cassette case 3 to be loaded into and unloaded from the slot 4. A drive circuit board 7 and a controller circuit board 8 are arranged opposite to each other, with some clearance provided between them. Both boards 7 and 8 are parallel to the relevant bottom surface so that the clearance can be used as a duct for air which passes through the air vent 5.

Since the drive mechanism 60 of the drive unit 1 is sealed with the dust-tight cover 9, no air enter the drive mechanism 60 from the outside, effectively preventing adhesion of the outside dust to the disk and various optical components composing the optical head. This maintains the light quantity at a high level, whereby information can be recorded and reproduced accurately and stably over a long time.

Since the clearance between the drive circuit board 7 and controller circuit board 8 functions as a duct of the air passing through the air vent 5, heat is effectively radiated from the circuits mounted to these circuit boards 7 and 8. Since no dust sticks to these circuit boards 7 and 8, the circuits perform their functions efficiently. This eliminates the necessity of cleaning outside air by a filter. Consequently, even when cooling is carried out by a cooling fan in the optical memory device no filter is required, and a small-capacity cooling fan is sufficient, resulting in the low cost of the drive unit.

Figure 3:
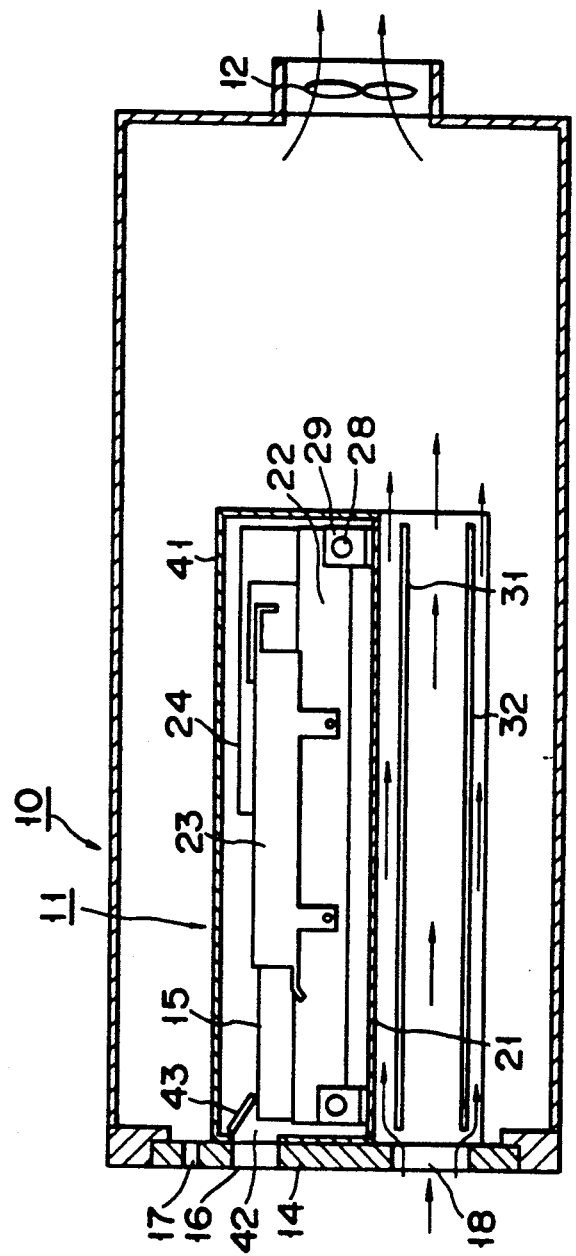

FIG. 3 is a sectional view of the second embodiment, and FIG. 4 is the exploded oblique view. The embodiment shows a drive unit 11 for use in an optical memory device 10 of a photoelectro-magnetic disk subsystem structure or of a photoelectro-magnetic disk built in a personal computer. This unit 11 has a cooling fan 12 connected to the back of the optical memory device 10. Air is introduced through the front panel 14 into the drive unit 11 and is expelled outside. A slot 16 is formed in the front panel 14, a cassette case 15 containing a photoelectro-magnetic disk can be loaded into and unloaded from the unit 11. Air vents 17 and 18 are formed in the panel 14, above and below the slot 16. Air can blow into the optical memory unit 10 through the vents 17 and 18. An eject switch 19 is mounted on the panel 14, for ejecting the cassette case 15 from the drive unit 11.

Figure 5:
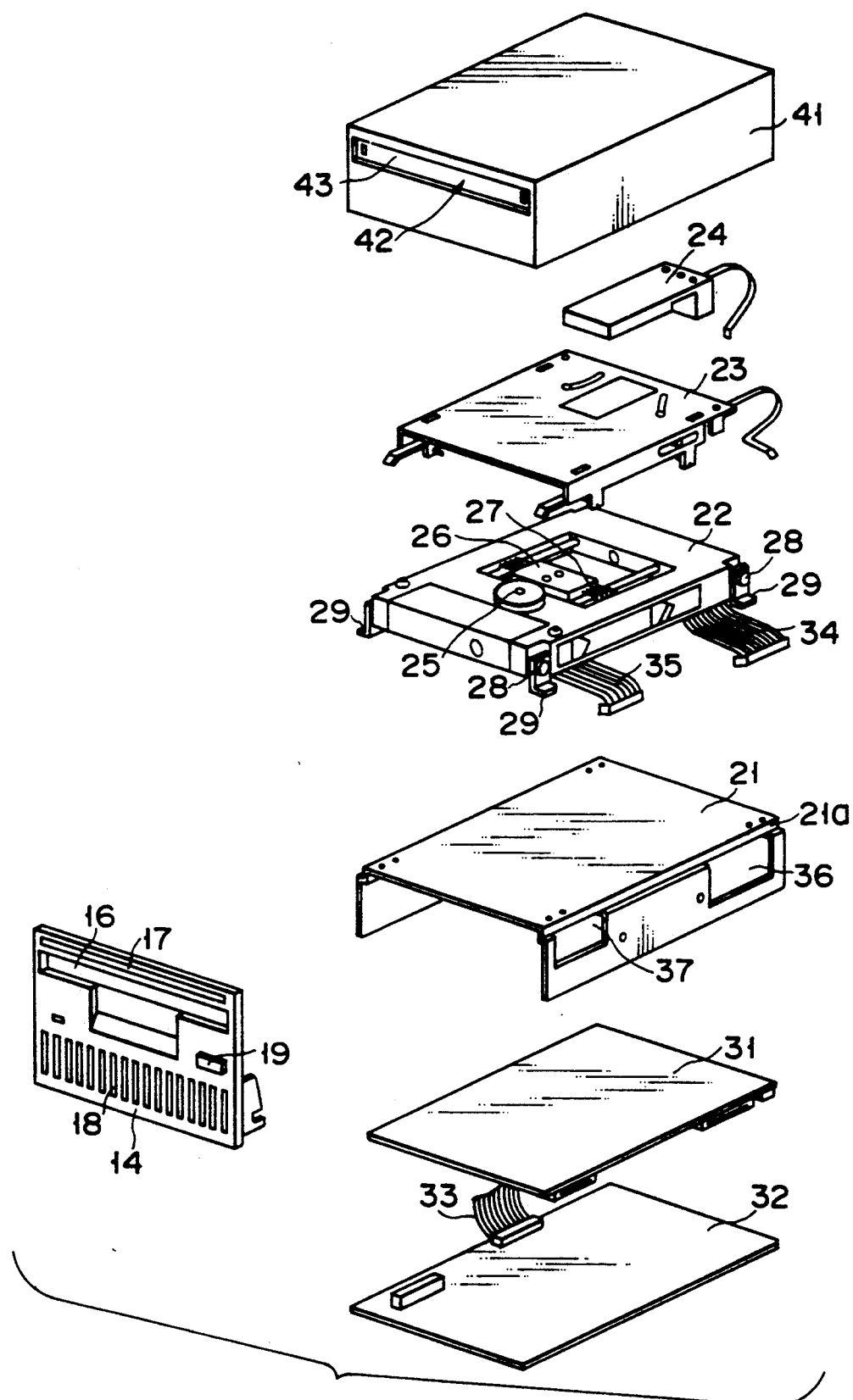
FIG. 5 is an exploded oblique view of a drive unit according to the present invention.

A deck unit 22 is connected to the drive unit 11. The deck unit 22 is fixed on the top surface of an inverted U-shaped frame 21 as is shown in FIG. 5. To this deck unit 22, a field unit 24 is secured by a holder unit 23. Between the deck unit 22 and the field unit 24, the cassette case 15 is to be loaded.

The deck unit 22 comprises a spindle motor 25 which rotates the disk in the loaded cassette case 15, an optical head 26 which records and/or reproduces the information to the photoelectro-magnetic disk, a drive mechanism which drives the optical head 26 in the disk radial direction, and a loading mechanism (not shown) which loads the cassette case 15. The deck unit 22 is fixed to the frame 21 via an insulator 28 and a supporter 29.

Under the deck unit 22, there are provided a drive circuit board 31 having a power control for the semiconductor laser incorporated in the optical head 26, a processor circuit for reading of information from the disk, and a control circuit for the drive mechanism used to drive the optical head 26 in the radial direction of the disk, and a controller circuit board 32 having a main circuit for controlling the drive unit in accordance with a host command. These components are located opposite to each other. The boards 31 and 32 are connected by a harness 33. Two harnesses 34 and 35 extend from the deck unit 22 to the board 31, passing through opening 36 and 37 made in one side of the frame 21.

In this embodiment, groove 21a are made in both edges of the top surface of the frame 21, each grooves extending along the edge. A dust-protection cover 41, formed by drawing or die-casting, is attached to the frame 21. The dust-protection cover 41 engages with these grooves 21a and encircles the deck unit 22, the holder unit 23, and the drive mechanism having the field unit 24. It is kept in contact with the front panel 14 between the air vents 17 and 18. The grooves 21a are so formed as to permit the harnesses 34 and 35 to pass through the openings 36 and 37. In these grooves 21a, rubber or sponge-form sealing members are located. The dust-protection cover compressing the sealing members contacts the frame 21.

The dust-protection cover 41 has an opening 42 at the section corresponding to the slot 16 of the front panel 14. A cover 43 is provided for closing the opening 42. When this cover 43 is opened, the cassette case 15 can be loaded or unloaded through the slot 16. In this embodiment, the cover 43 is driven by the energizing means (not illustrated, thus closing the opening 42) when the cassette case 15 is not loaded. The cover 43 rotates against the energizing means when the cassette case 15 is inserted, thus opening the opening 42 open, with the rotatably moving tip end kept in contact with the top surface of the cassette case 15. It is rotated by the energizing means, thus closing the opening 42, after the relevant cassette case 15 is unloaded.

Since the deck unit 22, holder unit 23, and the drive mechanism of the drive unit 11 having the field unit 24 are nearly completely sealed with the dust-protection cover 41 between the air vents 17 and 18, outside air, if introduced by the cooling fan 12, does not flows into the drive mechanism. Consequently, as in the first embodiment, this embodiment can effectively prevent adhesion of dust to the disk and various optical components of the optical head 26. Therefore, any reduction of light quantity does not occur, and information can be recorded and reproduced over a long time.

The space between the drive circuit board 31 and the controller circuit board 32, which serves as a duct of the air passing through the air vent 18, can sufficiently secure the heat radiation effect of the circuits mounted on these circuit boards 31 and 32, scarcely deteriorating the functions of the circuits mounted on these circuit boards 31 and 32. This eliminates the need of cleaning outside air by a filter provided at the air vent 18, makes it sufficient to use a cooling fan a small capacity, and can reduce the total cost of the optical memory device 10.

In addition, the outside air, introduced through the air vents 17 and 18 by the cooling fan, contacts the outer surface of the dust-protection cover 41, effectively preventing a temperature rise of the drive mechanism.

Figure 6:
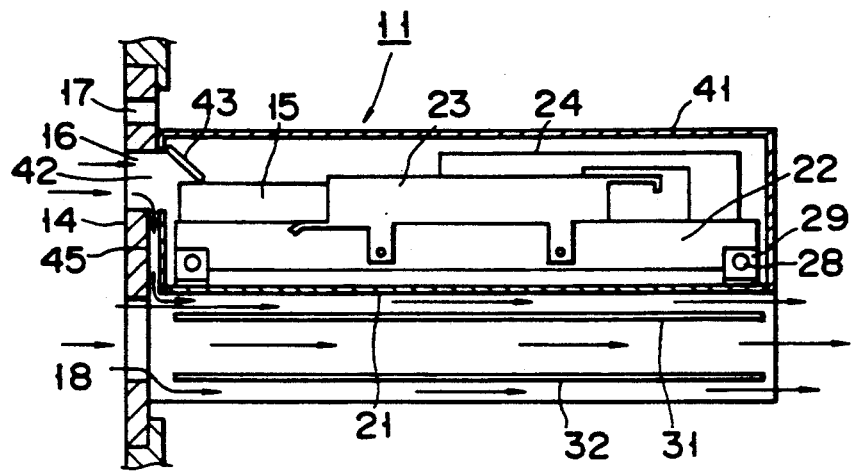
FIG. 6 is a sectional view of a drive unit according to a third embodiment of the present invention, showing the main components of the unit.

FIG. 6 shows the principal portion of the third embodiment of the present invention. This embodiment is designed to provide an additional air passage connected to the slot 16 with and located below the slot 16. The air passage extends between the front surface of the dust-protection cover 41 of the drive unit 11 and the back surface of the front panel 14. The third embodiment is, identical to the second embodiment in any outer respect.

The additional air passage 45 mixes the air entering through the slot 16 the air supplied via the air vent 18, preventing the entry of outside air to the dust-protection cover 41 more positively.

Figure 7:
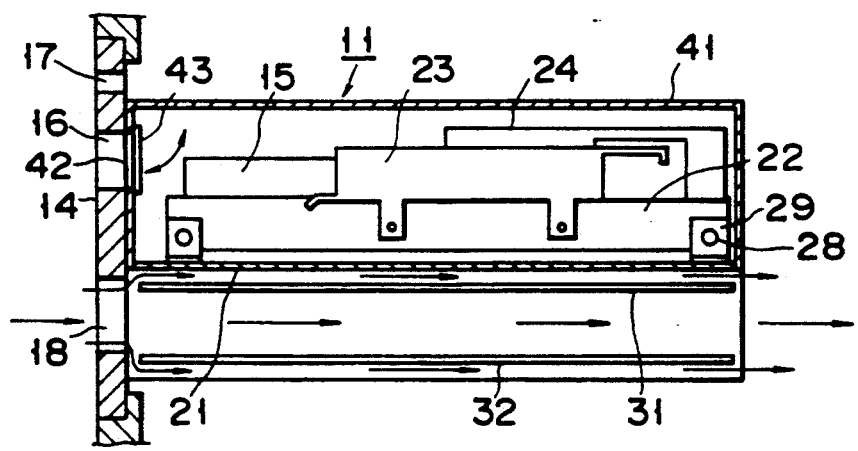
FIG. 7 is a sectional view of a drive unit according to a fourth embodiment of the present invention, showing the principal portion.

FIG. 7 shows the principal portion of the fourth embodiment of the present invention. This embodiment is designed to close the opening 42 with the cover 43 of the dust protection cover 41 of the drive unit 11, after the cassette case 15 has been loaded into or unloaded from the unit 11. The fourth embodiment is identical to the embodiment 2 in any other respect.

Since the opening 42 is closed with the cover 43 after the cassette case 15 is loaded, the deck unit 22 is completely sealed by the frame 21, dust-protection cover 41, and cover 43. Hence, dust cannot enter from the outside into the drive mechanism of the drive unit 11.

Figure 8:
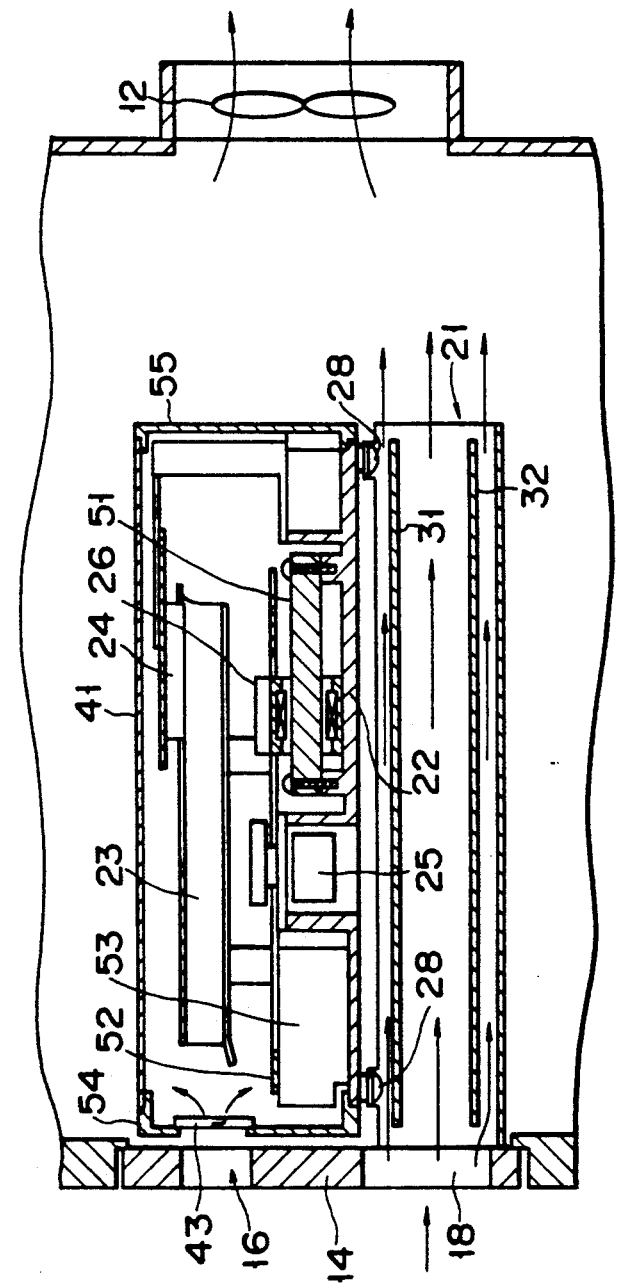
FIGS. 8 and 9 are a sectional view and an exploded oblique view, respectively, of a drive unit according to a fifth embodiment of the present invention, showing the principal portion.
Figure 9:
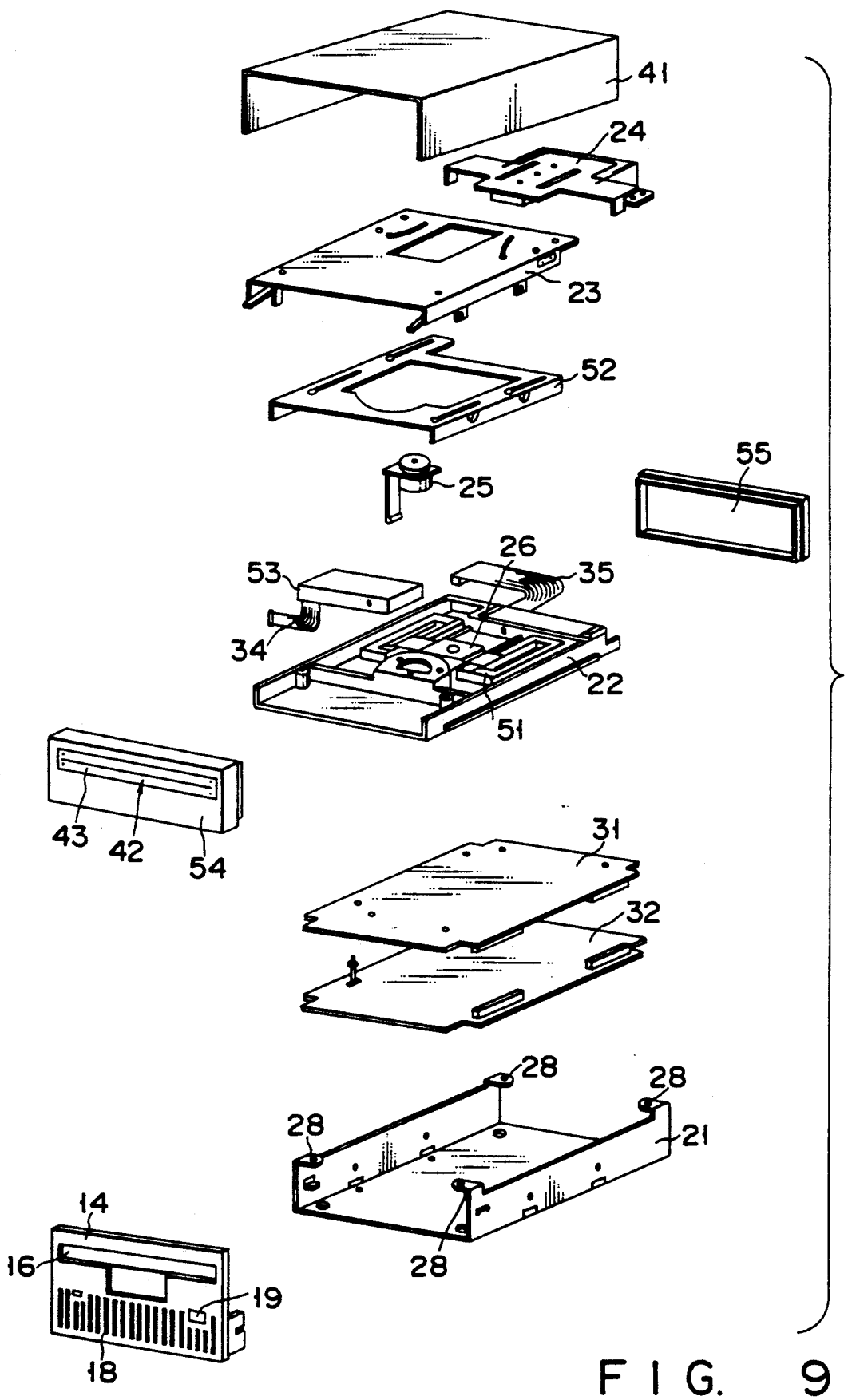

FIG. 8 is a sectional view showing the principal portion of the fifth embodiment of the present invention. FIG. 9 is an exploded oblique view. In this embodiment, the base member of the deck unit 22, which comprises a spindle motor 25 to rotate the disk, a optical head 26 to record and/or reproduce the information to the disk, and a voice coil motor (VCM) that composes the drive mechanism to drive the optical head 26 in the radial direction of a disk is installed on the lower side of the spindle motor 25 and VCM 51 and is fixed to a frame 21 by an insulator 28. To the deck unit 22, a holder unit 23 is attached which holds and transports the cassette case by a loading drive plate 52. To the front side of the deck unit 22, an autoloading drive unit 53 is attached, which drives the loading drive plate 52 in the longitudinal direction of the drive unit 11. To the rear side, a field unit 24 is connected. In addition, a front cover unit 54 is provided at the front end of the deck unit; a rear cover 55 is located at the rear end.

The front cover unit 54 has an opening 42 made in the section corresponding to the slot 16 of the front panel 14. A cover 43 is provided to close and open the slot 16, so that a cassette case (not shown) can be loaded and unloaded through the slot 16. The cover 43 is driven to close the opening 42 by energizing means (not illustrated) after the cassette case has been loaded or unloaded.

A drive circuit board 31 and a controller circuit board 32 are arranged below the deck unit 22. The drive circuit board 31 has a power control for the semiconductor laser incorporated in the optical head 26, a reading circuit for processing the information reproduced from the disk, and a control circuit for a VCM 51 which drives the optical head 26 in the radial direction of the disk. The controller circuit board 32 has a main circuit for controlling the drive unit in accordance with a host command and circuits for decoding the command and correcting errors. The boards 31 and 32 oppose each other, defining clearance which functions as a duct of the air passing through the air vent 18. The drive circuit board 31 is secured to the base member of the deck unit 22. The controller circuit board 32 is connected to the drive circuit board 31 by connector which achieves both electrical connection and mechanical fastening. Harnesses 34, 35 extend from the deck unit 22, and are squeeze-held by rubber or sponge-form sealing members (not shown) between the base member of the deck unit 22 and a front cover unit 54 or a rear cover 55.

In this embodiment, a dust-protection cover 41 engages with the front cover unit 54, rear cover 55, and deck unit 22, and surrounds the mechanism mounted on the deck unit 22.

The drive mechanism of the drive unit 11, that is, the deck unit 22 and the mechanism located on the deck unit 22, are nearly completely sealed with the front cover unit 54, rear cover 55, dust-protection cover 41, and the base member of the deck unit 22. Therefore, even if air is introduced by the cooling fan 12, it cannot flow into the drive mechanism. Consequently, as in the second embodiment, dust is prevented from adhering to the disk and the various components of the optical head 26. Hence no reduction of light quantity occurs, and information can be recorded and reproduced over a long time accurately and stably.

The space between the drive circuit board 31 and the controller circuit board 32 serves as a duct of air passing through the air vent 18. It promotes heat radiation from the circuits mounted on the circuit boards 31 and 32. Since no dust sticks to the circuit boards 31 and 32 the circuits mounted on the boards 31 and 32 function well. This eliminates the need of cleaning air by a filter. Only a cooling fan of small capacity is required. The cost of the optical memory device 10 can be low.

Furthermore, the spindle motor 25, VCM 51, etc., which are heat sources in the drive mechanism, are mounted directly on the base member of the deck unit 22. Therefore, the heat from these heat sources are conducted to the base member efficiently through each fitted portion, and outside air introduced through the air vent 18 by the cooling fan 12 is allowed to flow in contact with the outside surface of the base member of the deck unit 22. This effectively holds a temperature rise of the drive mechanism, below the allowable value and helps to achieve stable recording and reproduction of information.

In the recently developed drive units, due to the increased output resulting from the reduction in weight of the optical head (i.e., a mobile part), the increased rotating speed of the disk (high access speed), and increased transmission rate, more heat is generated, inevitably increasing the temperature rise in the drive unit. If temperature in the drive unit cannot be held below the allowable value, the information recorded on the disk may be destroyed, or the life of the laser diode (light source) and other electronic parts may be shortened. Also, the member holding the optical parts may be deformed by heat, causing the optical axis to deviate, and rendering stable recording and reproduction impossible. However, in the embodiments described above, The temperature in the drive mechanism can be effectively held below the allowable value, and information can be recorded and reproduced stably. This is because the spindle motor 25, VCM 51, etc., which are heat sources in the drive mechanism, are mounted directly on the base member of the deck unit 22, and the heat from these heat sources is transmitted to the base member efficiently cooled with the outside air stream.

In the fifth embodiment, as in the fourth embodiment, the opening 42 is closed with the cover 43 while the cassette case is kept loaded. The deck unit 22 can be nearly completely sealed with the front cover unit 54, the rear cover 55, the dust-protection cover 41, the base member of the deck unit 22, and the cover 43 over the cassette case has been loaded or unloaded. Therefore, the entry of dust from the outside into the drive mechanism of the drive unit 11 is prevented more securely.

The present invention can be effectively applied not only to an optical memory device using photoelectro-magnetic disks, but also to an optical memory device using optical disks.

As described above, according to one aspect of the present invention, the drive mechanism of the drive unit is sealed nearly completely with the dust-protection cover. Therefore, even if the drive unit is incorporated in an optical unit having a cooling fan which admits outside air, entry and adhesion of dust from the outside to the recording medium and the various components of the optical head can be effectively prevented. Therefore, the recording and reproduction of information can be accurately and stably carried out over a long time, since the light quantity is sufficient.

Figure 10:
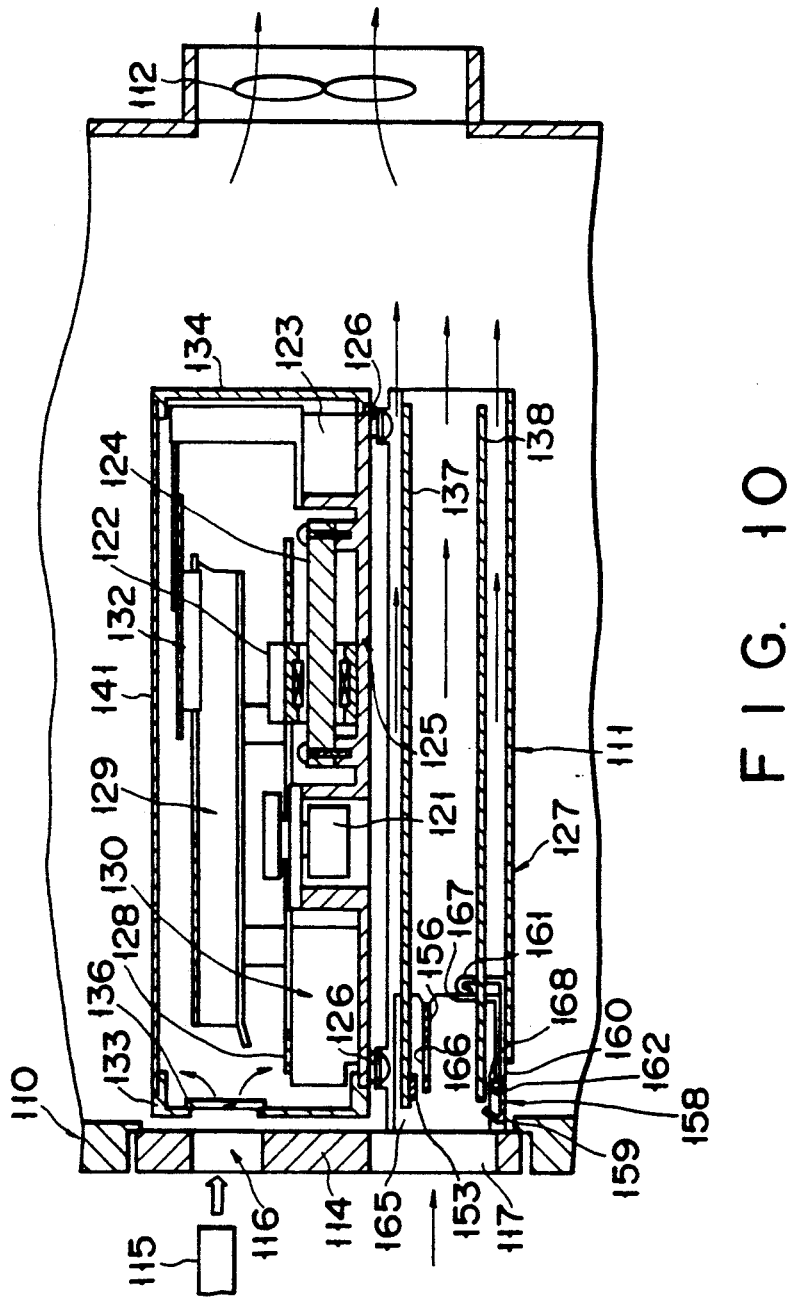
FIGS. 10 and 11 are a sectional view and an exploded oblique view, respectively, of a drive unit according to a sixth embodiment of the present invention, showing the principal portion.
Figure 11:
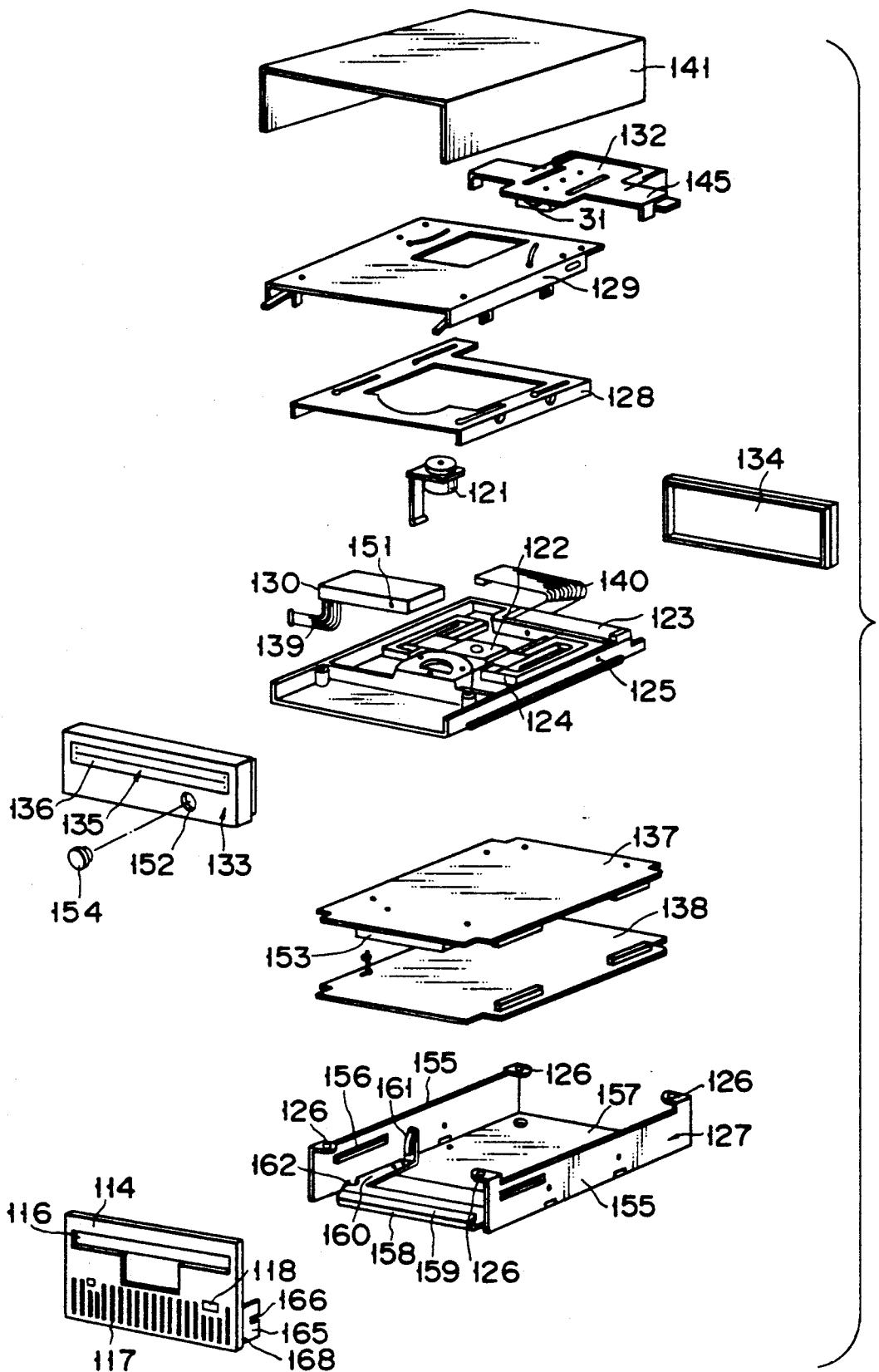

FIG. 10 is a sectional view of the sixth embodiment, and FIG. 11 is an exploded oblique view. The sixth embodiment is designed for use in the case where a photoelectro-magnetic disk unit 11 is attached to the optical memory device 110 of the photoelectro-magnetic disk subsystem built in a personal computer, and a cooling fan 112 is installed at the back of the optical memory device 110 to introduce air through the front panel 114 of the photoelectro-magnetic disk unit 111 and let it out to the outside. A slot 116 is made in the front panel 114. A cassette case 115 containing a photoelectro-magnetic disk can be loaded into and unloaded from the unit 111, and to the top and the bottom of the slot, an air vent 117 to introduce outside air into the optical memory unit 110 is formed in the panel 114, above the slot 116. An eject switch 118 to eject the loaded cassette case 115 from the photoelectro-magnetic disk unit 111 is provided on the panel 114, below the slot 116.

The photoelectro-magnetic disk unit 111 comprises a spindle motor 121 for rotating a disk, an optical system mobile section 122 having the objective lens for recording, erasing and reproducing information from the disk, and a deck unit 125 having an optical system 123 comprising a semiconductor laser and optical detectors, and a voice coil motor (VCM) 124 for driving the optical system mobile section 122 in the radial direction of the disk. This deck unit 125 is fixed to the frame 127 by an insulator 126. A holder unit 129 that holds and transports the cassette 115 by a drive plate 128 for loading and ejection, and a drive unit 130 which drives the driving plate 128 in the longitudinal direction of the photoelectro-magnetic disk are attached to the front side of the deck unit 125. A field unit 132 having the field coil 131 is attached to the rear side. In addition, a front cover unit 133 is connected to the front end of the deck unit 125, a rear cover 134 is connected to the rear end.

The front cover unit 133, has an opening 135 made in the section corresponding to the slot 116 of the front panel 114. A cover 136 is installed, for closing and opening the slot 116. The cover 136 is driven to close the opening 135, by energizing means (not shown) once the cassette 115 has been loaded or unloaded.

In addition, a drive circuit board 137 and a controller circuit board 138 are arranged below the deck unit 125. The drive circuit board 137 has a power control for the semiconductor laser incorporated in the optical-system fixing section 123, a processor circuit for reading information from the disk, a VCM 124 control circuit for driving the optical system movable section 122 in the radial direction of the disk. The controller circuit board 138 has a main circuit that controls the photoelectro-magnetic disk unit in accordance with a host command and circuits to decode the command and correct errors. The boards 137 and 138 are located opposite to each other, defining clearance functioning as a duct of the air passing through the air vent 117. The drive circuit board 137 is connected to the base member of the deck unit 125, and the controller circuit board 138 is connected to the drive circuit board 137 by a board-to-board connector which achieves both electrical connection and mechanical fastening. Harnesses 139 and 140 extend from the deck unit 125. They are squeeze-held by rubber or sponge-form sealing members (not shown) between the base member of the deck unit 125 and the front cover unit 133 or the rear cover 134.

In this embodiment, the mechanism on the deck unit 125 is brought into engagement with the front cover unit 133, rear cover 134, and deck unit 125, and is surrounded by a dust-protection cover 141.

Figure 12:
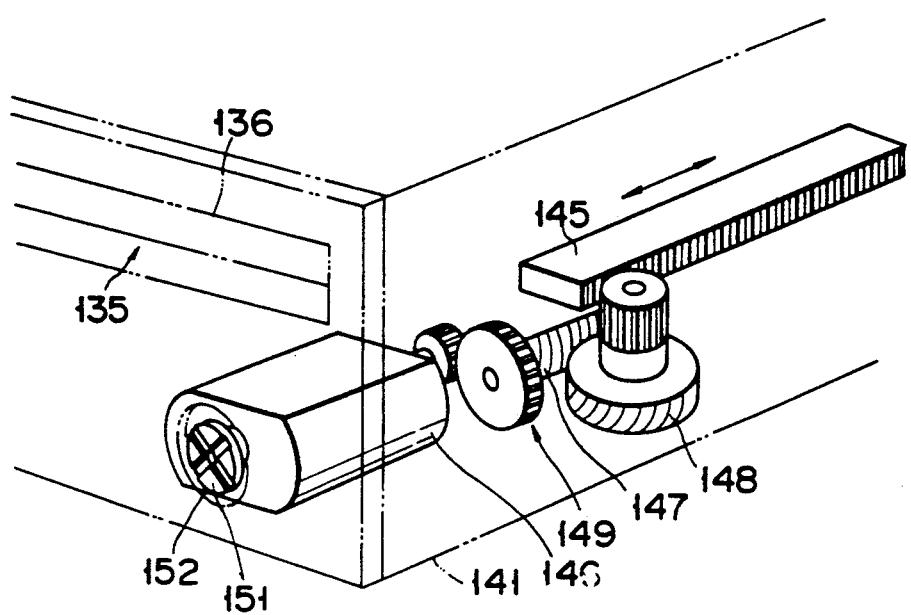
FIG. 12 is an oblique view of a drive plate, showing a principal portion.

To the driving plate 128, a rack 145 as shown in FIG. 12 is attached. To the drive unit 130, a gear mechanism 149 which has a motor 146 and worm gear 147, and worm wheel 148 is attached. The driving plate 128 can therefore be driven by the motor 146, gear mechanism 149, and rack 145. In order to discharge the cassette 115 immediately from the deck unit 125 at the time of power failure or the loading and ejection mechanism, an emergency discharger operator 151 is connected to the shaft of the motor 146 of the driving unit 130. The shaft of the motor 146 can be rotated, by manually operating the emergency discharger operator 151 with a screwdriver inserted through the emergency discharge hole 152 formed in the front cover unit 133, with the front panel 114 removed. The emergency discharger operator hole 152 is normally closed with a rubber cap 154.

On the side of the front panel 114 of the drive circuit board 137, there are provided a check terminal for checking each section during adjustment, and/or a section 153 for checking the indicators which indicate failure portions at the time of failure.

Now, the loading and unloading mechanism of the front panel 114 will be described.

Figure 13:
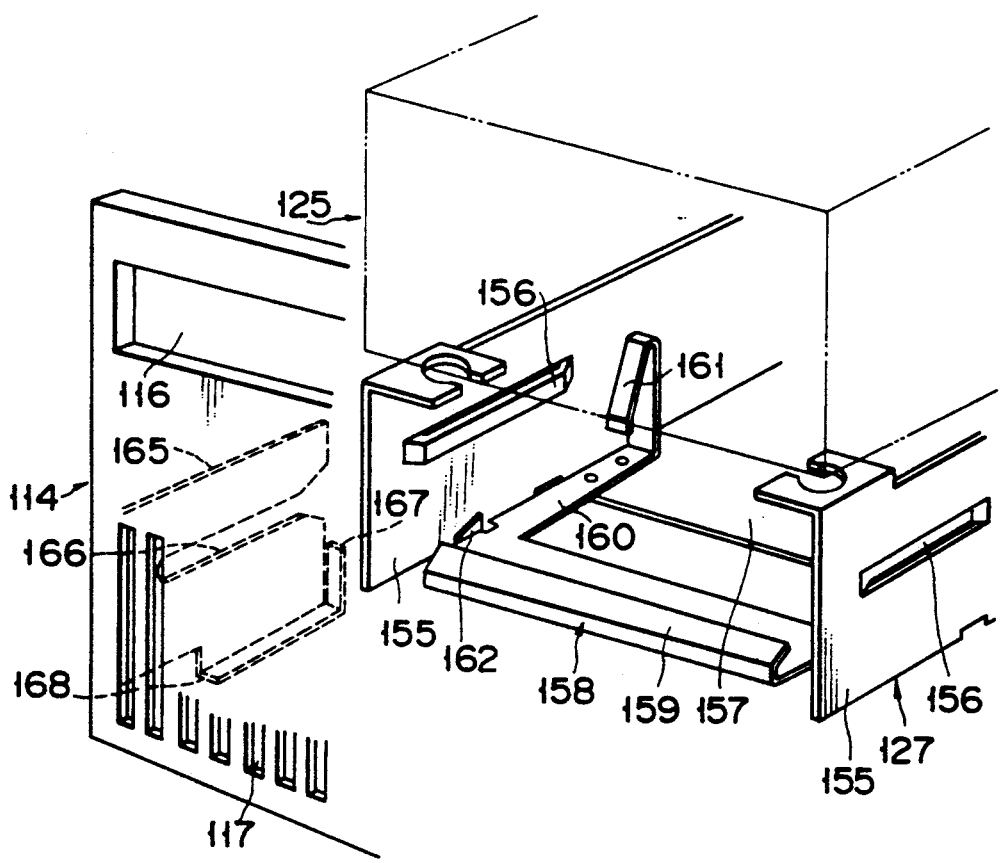
FIG. 13 is a view showing the mounting and removal mechanism of the front panel.

As is shown in FIG. 13, a guide 156 is formed inside the both sides 155 of the frame 127. The guide 156 guides the front panel 114 in the loading and unloading direction, in this embodiment, in the insertion direction of the cassette 115. A lock release operator 158 for loading and unloading the front pane 114 is installed on the bottom surface 157. The lock release operator 158 is formed in an inverted U shape, and has an operator section 159 existing over nearly the whole width of the front panel 114, and two flexible sides 160 opposite to each other and continuous from the operator section. The ends of the two sides 160 are fixed to the edges of both sides of the bottom surface 157 of the frame 127. These edges are raised, respectively. Spring sections 161 are connected to the raised sections, for removing the front panel 114. To both edge sections near the operator section 159, protrusions 162 which engage with the latch of the front panel 114 (later discussed) are formed, respectively.

The front panel 114 has a guide panel 165 inside the edges on both sides, extending in the cassette 115 insertion direction. These guide plates 165 have notches 166 which latch the guides 156 formed on the frame 127 and extend in the cassette insertion direction respectively. The guide panel 165 has a contact section 167 which contacts the spring 161 of the lock release operator 158. A latch 168, which engages with the protrusion 162 of the lock releasing operator 158, is formed on the bottom of the panel 165.

When the front panel 114 is mounted, as shown in FIGS. 14A and 14B, and inserted, with the notch 166 of the guide panel 165 latched to the guide 156 of the frame 127, the protrusion 162 of the lock releasing operator 158 contacts the bottom of the guide panel 165 and is displaced downward by the elasticity of the side 160. Thereafter, the contact 167 at the tip end of the guide panel 165 contacts the spring 161 of the lock release operator 158 and presses the front panel 114 against the spring force of the spring section 161. Then, as is shown in FIG. 14C, the protrusion 162 engages with the latch 168 of the bottom of the guide panel 165 by the recovery force of the side 160 of the lock release operator 158. At the same time the latch condition is effectively maintained by the spring force of the spring section 161, thereby locking the front panel 114 to the frame 127.

To remove the front panel 114 from the frame 127, as shown in FIG. 15A, a coin 171, a ball-point pen, or the like is inserted into the air vent 117 of the front panel 114, thereby displacing the operator 159 of the lock release operator 158 downward against the spring force as is shown in FIG. 15B and releasing the protrusion 162 of the lock release operator 158 from the latch 168 of the guide panel 165. Then, the front panel 114 jumps out to this side to the position, where it is not locked again by the recovery force of the spring 161 of the lock release operator 158, as is shown in FIG. 15C. Thereafter, the drawing of the front panel 114 along the guide 156 of the frame 127 allows for removal of the front panel.

In this way, according to this embodiment, the front panel 114 can easily be loaded and unloaded to the frame 127, discharging the cassette 115 easily from the deck unit 125 when power fails or the loading and eject mechanism breaks down. Also adjustment by the checking section 153 or checking of the trouble portions can be easily attained.

Figure 16:
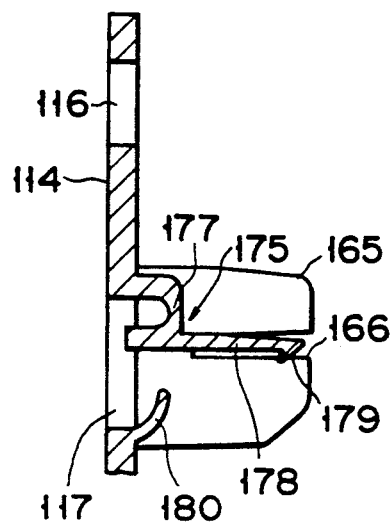
FIGS. 16 and 17 are views showing the principal portion of a drive unit according to a seventh embodiment of the present invention.
Figure 17:
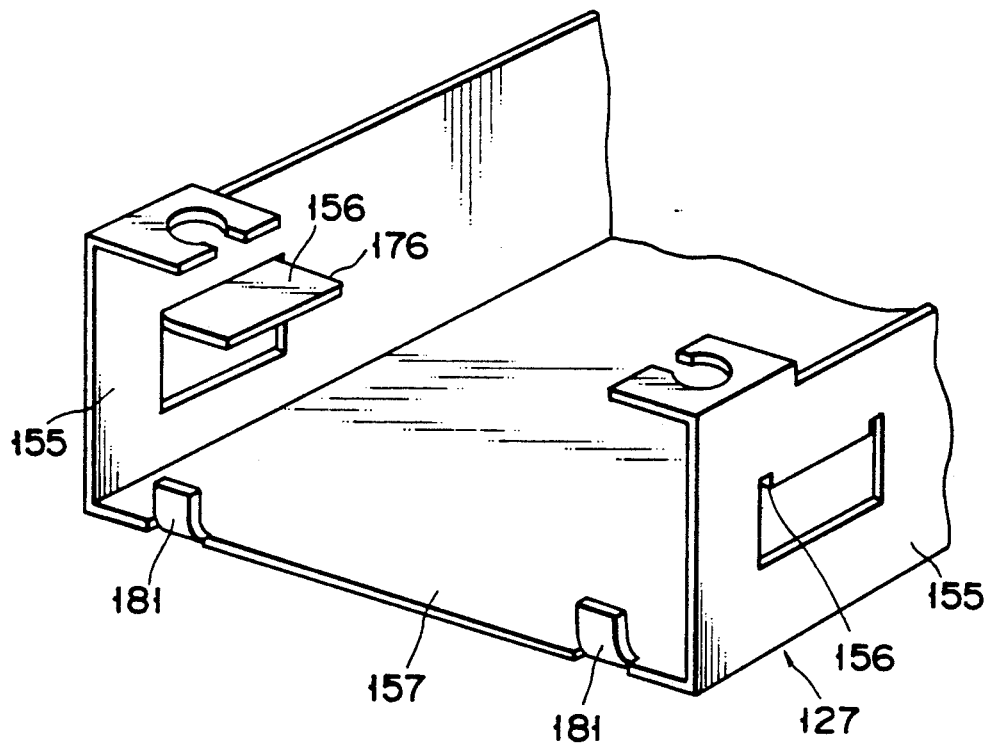

FIGS. 16 and 17 show the principal portion of the seventh embodiment of the present invention. In this embodiment, a lock release operator 175 is installed at a front panel 114, and a latch is secured to the frame 127. The seventh embodiment is identical to the sixth embodiment in other respects. As shown in FIG. 16, the lock release operator 175 is formed integral with one of the front panel 114, inside one or both side edges. In this lock release operator 175, an operator section 178 extends in the cassette insertion direction, from the hole of a air vent 117 at the height nearly similar to the notch 166 of the guide plate 16 through elastically deformable section 177. A protrusion 179 extends downwards at the tip end of this operator section 178. Inside the front panel 114, an elastic piece 180 is provided integral with the front pane contacting the raised section provided in the frame 127 (later discussed).

As is shown in FIG. 17, the frame 127 has a latch 176 engaging with a protrusion 179 provided on the front panel 114, at the end of the guide engaging with the notch of the guide plate 165 of the front panel 114. On the bottom surface 157, there is formed a raised section 181 which contacts an elastic piece 180 provided on the front panel 114.

According to this embodiment, to install the front panel 114, as in the sixth embodiment, when the front panel 114 is inserted into the notch 166 of the guide plate 165 engaged with the guide 156 of the frame 127, the protrusion 179 of the lock release operator 175 contacts the top surface of the guide 156 of the frame 127, and the protrusion 179 moves, thus displacing the elastic-deformable section 177. Thereafter, the elastic piece 180 provided on the front panel 114 contacts the raised section 181 provided on the frame 127, and presses the front panel against the spring force of the elastic piece 180. As a result, the protrusion 179 of the lock release operator 175 abuts on the top surface of the guide 156 of the frame 127, and the protrusion 179 engages with the latch 176 of the guide 156 by the recovery force of the elastic-deforming section 177. At the same time, the engagement is effectively held by the spring force of the elastic piece 180, and the front panel 114 is thereby locked to the frame 127.

To remove the front panel 114 from the frame 127, as shown in FIG. 18B, a ball-point pen 185 or coin and the like is inserted into the air vent 117 of the front panel 114, displacing the operator section 178 of the lock release operator 175 and releasing the protrusion 179 of the lock release operator 175 from the latch 176 of the guide 156. Then, the front panel 114 jumps out to this side, to the position where it cannot be locked again by the recovery force of the elastic piece 180. Thereafter, the front panel frame can be removed by pulling out the front panel 114 along the guide 156 of the frame 127.

Also in the seventh embodiment, the front panel 114 can be easily mounted onto and removed from the frame 127. Therefore, as in the embodiment 6, the emergency discharge of the cassette 115 from the deck unit 125, adjustment by check sections 153, and the checking of troubled portions can be easily carried out.

The present invention should not be limited to the embodiments described above. Various modifications and changes are possible. For example, in the sixth embodiment, the protrusion 162 can be semi-spherical, and the latch can be a round hole formed in a plane surface. The embodiments mentioned above have means for moving the front panel 114 in the removing direction, but such means can be omitted. In addition, the present invention can be effectively applied not only to the photoelectro-magnetic disk units described above, but also to the optical disk units and other types of drive units for optical memory devices.

As described above, according to another aspect of the present invention, by providing a lock release operator having an elastically displaceable protrusion at the front panel or the main body, by providing a latch engaging with this protrusion of the lock release operator at the unit proper or front panel, by locking the front panel to the main body by engaging the protrusion with the latch by the elastic force of the lock release operator, and by releasing the engagement of the protrusion and latch by displacing the lock release operator against the elastic force, the front panel is released and removed from the unit proper. This simple configuration permits easy attaching and detaching of the front panel. Consequently, the cassette can be easily discharged urgently from the deck unit at the time of power failure or the loading and eject mechanism, or adjustment can be easily achieved.

FIG. 19A through 32 show the eighth embodiment. FIG. 19A through 25 shows primarily the front cover open/close unit, while FIG. 26 through 32 shows primarily the loading unit.

Figure 20:
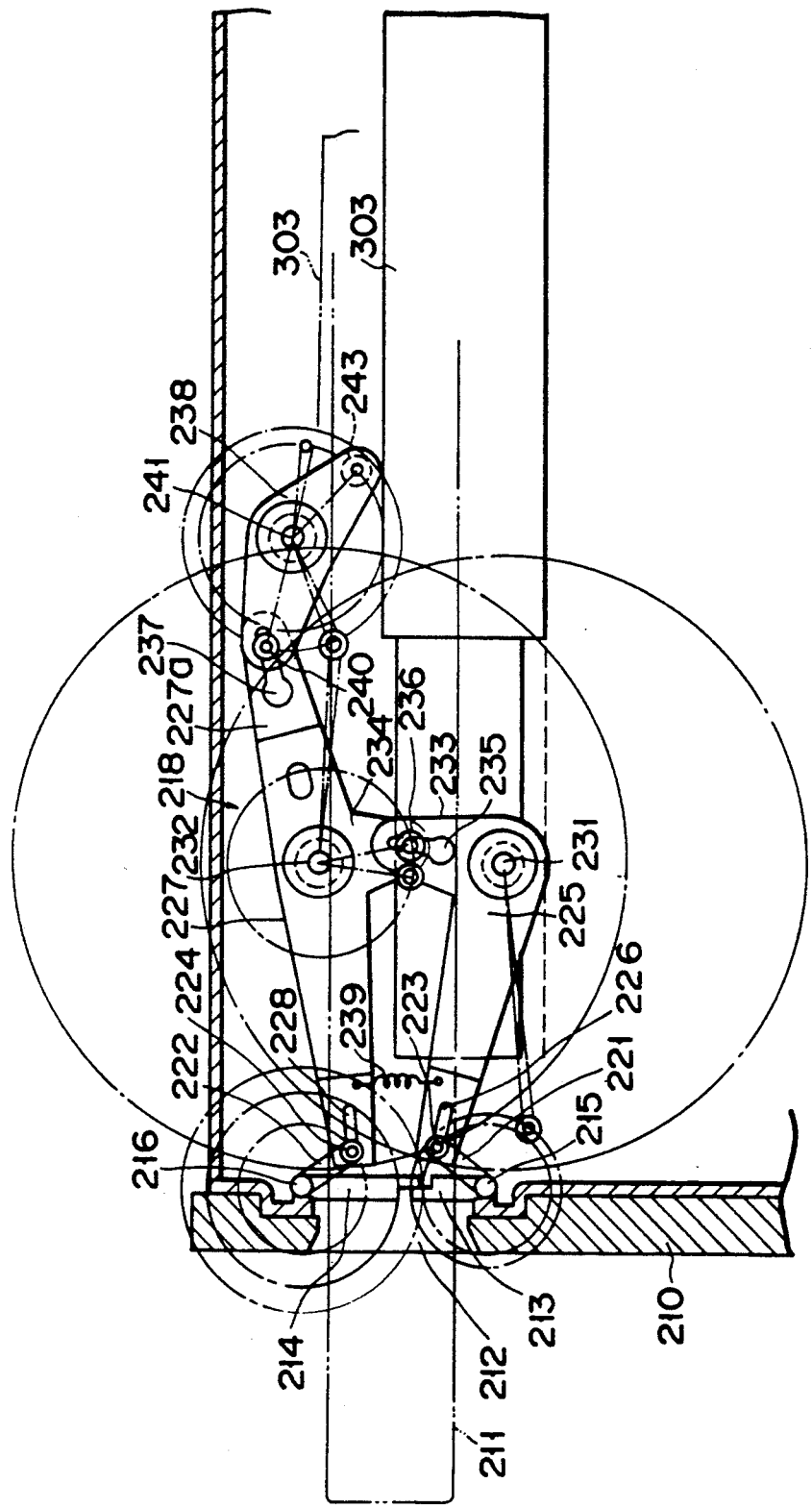
Figure 21:
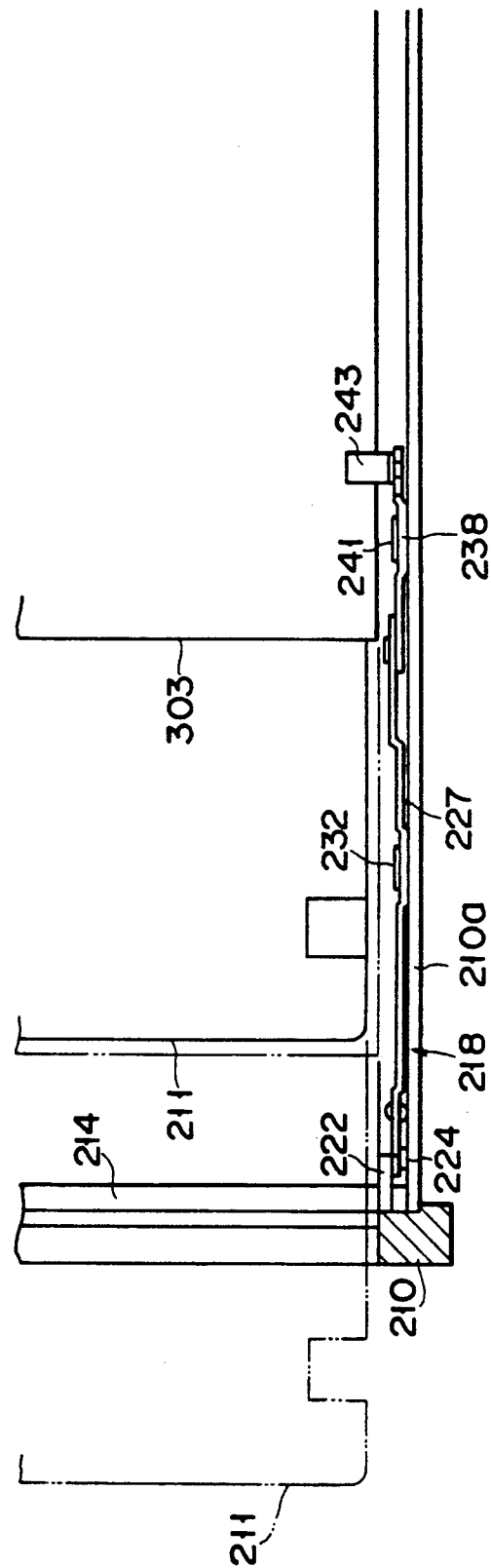

As shown in FIGS. 20 and 21, a slot 212 is formed in the front surface of the unit proper 210 in the information processor, to allow passage of a cartridge (medium) later discussed. First and second front covers 213 and 214 are provided to open and close the slot 212. The first front cover 213 is located at the lower side. The bottom end of cover 213 is pivotally-mounted on a shaft 215, and the top end of the cover 213 a rotatable end. The second front cover 214 is located at the upper side. Its top end is pivot-mounted on a shaft 216, and its bottom end is a rotatable end. When these front covers 213 and 214 are closed, the rotatably moving ends overlap each other, and the top end of the first front cover 213 is located outside the top end of the second front cover 214 and overlaps it. As shown in FIG. 19B, the rotation radium $R_1$ of the first front cover 213 is smaller than that $R_2$ of the second front cover 214.

The front covers 213 and 214 in the folding door system are designed to open and close simultaneously, like a folding door, when driven by a front cover open/close mechanism 218 which operates in interlock with a loading mechanism (later discussed).

The front cover open/close mechanism 218 has the structure shown in FIGS. 20 and 21. It is incorporated in the side circuit board 210a of the main body 210. More specifically a first lever 221 is connected integral to the first front cover 213 by the shaft 215, while a second lever 222 is connected integral to the second front cover 214 by the shaft 216.

Latch pins 223 and 224 protrude from each rotatably moving tip end of the first lever 221 and the second lever 222. The latch pin 223 is fitted in a notched groove 226 formed in one end of a first link 225. The latch pin 224 is fitted in a notched groove 228 formed in one end of a second link 227. The first link 225 and the second link 227 are pivoted to fulcrums 231 and 232 and located at top and bottom, symmetrically to each other. In addition, arms 233 and 234 protrude from the first link 225 and the second link 227, respectively. The tip of the arm 233 of the first link 225 has a notched groove 235, in which a latch pin 236 producing from the arm 234 of the second link 227 is fitted. The first link 225 and the second link 227 operate in interlock, since they are connected by the engagement of the notch groove 235 and the latch pin 236. They rotate in the opposite directions to move the first front cover 213 and the second front cover 214 in the opposite direction, since the first lever 221 is engaged with the first link 225, and the second lever is engaged with the second link 222. The ends of the first link 22 and the second link 227 are connected to a tension coil spring 239 functioning as an energizing means. As long as the first link 225 and the second link 227 are energized, they are kept in the positions indicated by the solid lines in FIG. 20. That is, the first and second front covers 213 and 214 close the slot 212.

In addition, a link portion 227a protrudes from the above second link 227 to the rear side. An elongated hole 237 is formed in the tip of the portion 227a. In the elongated hole 237, a latch pin 240 formed on one end of the drive link 238 is fitted and engaged. The driving link 238 is designed to rotate around the fulcrum 241. At the other end of the driving link 238, a driving pin 242 and a roller 234, which is rotatably installed to the pin 242, are provided. This roller 243 is designed to rotate to contact the top surface of the cartridge holder 303, when operated by the loading unit (later discussed). Consequently, the driving link 238 rotates when the cartridge holder 303 is elevated. As a result, the second link 227 is moved. The front cover open/close mechanism 218 may be installed not only on one side of the unit proper 210, but also on the other side. The front cover open/close mechanism 218 can be installed in the same manner on both sides to operate in interlock, so as to serve as a tension coil spring 239 simultaneously.

Now, the loading unit, which houses and moves the cartridge 211 inserted through the slot 212, will be described.

FIG. 26 shows the loading unit in an exploded form. On a base 302 having a square opening made nearly at the center, a cartridge holder 303 is mounted. A cartridge 211 is mounted on the cartridge holder 303.

The cartridge 211 is a flat rectangular parallellopiped one, as is shown in FIG. 30 or 32. It has a hollow cartridge body 304a, is which a disk-form recording medium (hereinafter called "disk") 305 is rotatably housed. In the center of this cartridge body 304a, a circular opening 306 is formed. Through this opening 310, the cartridge is inserted into the cartridge holder 303. A rectangular opening 107 for recording and reproduction is formed also in the cartridge body 304a. A shutter 308 folded in the turned-down U shape is provided, covering the opening 107. The shutter 308 can be opened to open the opening 107. The shutter 308 is normally energized by an energized elastic body (not shown), in the direction to close the rectangular opening 307.

The cartridge holder 303 will be described. As is seen from the inserting direction of the cartridge 211, the cartridge holder is formed integral, in the form of letter C, to carry the cartridge 211. On the top surface of the cartridge holder 303, an opening 103, to which an external magnetic field application unit (not shown) to be used to record and erase, is formed at the position corresponding to that of the rectangular opening 307 of the cartridge body 304 containing the cartridge 211. At the four top surface corners, rectangular concave portion 303c are made extending in the insertion direction of the cartridge 211 inserted from the slot 103b. The concave portions 303c allow the cartridge 211 to be pressed against the base 302 upon completion of loading.

To both sides of the tip of the cartridge holder 303, which is the deepest portion as viewed in the insertion direction of the cartridge 211, latch pawls 311 made of elastic material (only one shown in FIG. 26) are installed to prevent dropping of the cartridge 211, as each latch pawl 311 engages the latch concave portion 304b of the cartridge 211 held in the cartridge holder 303.

To the tip of the cartridge holder 303, a pair of levers 312 (only one shown in FIGS. 19A and 19B) are supported by pins 313, to open and close the shutter 308 of the cartridge 211. The rotatable end of either lever 312 extends into the holder 303 and is energized in the outside direction by an elastic body 312a installed between the rotatably moving end and the cartridge holder 303. A stop pin 302e protrudes from the lever 312, extends through an arc-shaped elongated hold 303d formed in the top surface of the cartridge holder 303, and has a collar wider than the elongated hold 303d. The stop pin 303e is brought into contact with the end of the elongated hole 303d, restricting the rotation of the lever 312 and preventing the flapping of the end of the lever 312, by virtue of the collar.

A latch-fit pin 308a protrudes from the rotatable end extending into the holder 303. The shutter 308 has a concave portion 308a which engages with the latch-fit pin 312b. Consequently, if the cartridge 211 slides further into the cartridge holder, with the latch-fit pin 312b engaged with the concave portion 308a, the lever 312 is rotated against the energizing force of the elastic body 312a, and the shutter 308 slides to open the rectangular opening 307, exposing the disk 305.

On the tip of the cartridge holder 303, a switch 314 is installed to detect the completed insertion of cartridge 211. In addition, notches 303k for receiving rollers are formed in the right and left top surfaces of the cartridge holder 303.

On either side of the base 303, a notch 302a is cut, extending in the cartridge 211 inserting direction, to the depth, where latches (matching sections) 302b are located, extending in the direction at right angles to the notch 302a at four places. This makes it possible to guide the shafts (pins) 315 attached to legs 303f protruding from the sides of the cartridge holder 303, in the inserting direction (that is, the first direction). While engaged with the notches by the latches 302b, the shafts 315 can serve as the guide, travelling in the vertical direction intersecting with the first direction at right angles.

On the bottom of the base 302, a driving plate 316 formed in the inverted U letter shape is slidably installed via four shafts 317. A shaft 317 supporting the driving plate 316 slidably to the base 302 is latch-fitted in a guide hole 316a extending in the insertion direction of the driving plate 316, allowing it to travel in the guide hole 316a.

On the side of the driving plate 316, a slope 316c is formed by cutting the surface of the plate 316, in a semi-circular form, at the position corresponding to the shaft 315 installed to the cartridge holder 303. The slope 316c is connected to the concave 316b which serves as a holder when it moves in the first direction. The slope 316c has its height gradually increasing as it extends deeper. An auxiliary drive plate 318 having a slope 318a opposite to the slope 316c is slidably supported by a guide shaft 318b formed on the side of the driving plate 316.

Between the drive plate 316 and each auxiliary drive plate 318, an elastic body 319 is installed to apply a force to narrow the clearance between the opposite slopes 316c and 318a. That is, when the drive plate moves in the horizontal direction, the drive plate squeeze-holds the shaft 315 to hold it on the concave 316b with the force of the elastic body 319.

In other words, the force to narrow the space between the slopes 316c and 318a squeeze-holds the shaft 315 connected to the cartridge holder 303 in the concave 316b.

Adjacent to the opening at the center of the base 302, a turntable 320 is located to load the cartridge 211 and to be rotated by a spindle motor (not illustrated).

Now, the driving means 321 for moving the drive plate 316 will be described.

In the driving means 321, a worm wheel 321 is rotatably supported on a gear shaft 321c held by a plate type holder member 321a made of stainless steel or the like. The worm wheel 321b has an elongated hole 321d located near the periphery. An elastic plate 321f, which has a pin 321e engaged with the elongated hole 321d and with the elongated hole 316e of the drive plate 316, is rotatably supported by the same shaft supporting the worm wheel 321b.

A worm gear 321h, having a pulley 321g at one end, is meshed with the worm wheel 321b.

The pulley 321g is connected to the pulley 322a which is connected to the motor rotating shaft of a motor 322 mounted on the holder member 321a, by means of a belt 321i. The motor 322 drives the worm wheel 321b half a turn, via the belt 321i and worm gear 321, to move the drive plate 316.

The rotating position of the worm wheel 321h is detected by two switches 324 installed on a circuit board 323.

On either side near the root of the base 302, i.e., the slot side of the cartridge 211, a latch pin 302c is engaged in a latch hole 304c formed in the cartridge body 304a, thus positioning the cartridge 211 off the base 302 when the cartridge is moved vertically.

The operation of the embodiment will now be described. At first, to load the cartridge 211, the cartridge 211 is inserted through the slot 212 of the main body 210, pushing open the front covers 213 and 214 inward, further through the slot 303b into the cartridge holder 303 located in the main body 310.

Figure 27A:
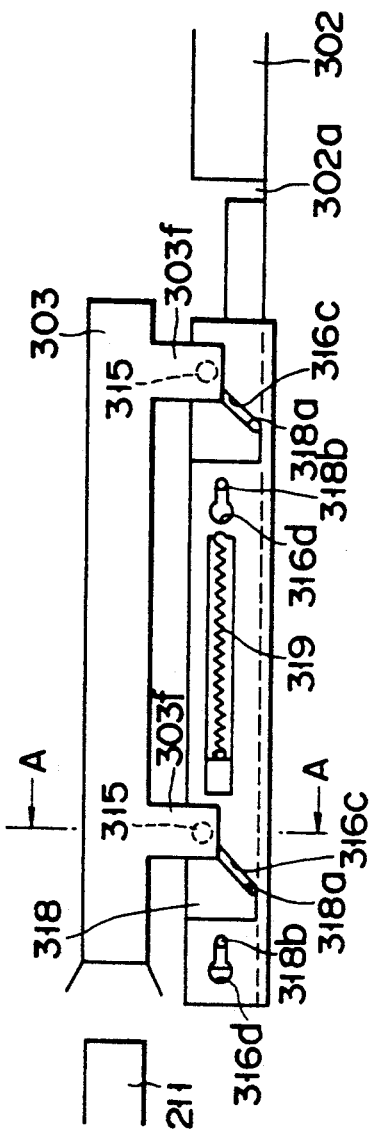

At this event, the shaft 315 installed on the side of the cartridge holder 303 is held in the concave 316b formed in the side of the drive plate 316, by virtue of the elastic body 319 installed between the auxiliary drive plate 318 and the drive plate 316. The drive plate 316 has been moved beforehand to the root (i.e., the left side in FIG. 27A through E) of the base 302, which is designated as slot 303b side of the cartridge, by means of the latch pin 321e protruding from the elastic plate 321f of the drive means 321. The cartridge holder 303 is moved toward the root as far as possible. At the same time, the cartridge holder is moved upward by a specified distance from the top surface of the base 302, as is shown in FIG. 27A.

Now, the cartridge 211 is inserted into the cartridge holder 303, in sliding contact with the cartridge holder. During this insertion, the latch-fit pin 312b protruding from the rotatable end of the open/close lever 312 engages with the concave portion 308a of the shutter 308 of the cartridge 211. As the cartridge 211 is inserted, the lever 312 is rotated against the energizing force of the elastic body 312a. At the same time, the shutter 308 of the cartridge 211 begins to slide.

The rotation of the lever 312 is stopped by bringing the stop pin 303e of the open/close lever into contact with one end of the top-end side of the elongated hole 303d. At the same time, insertion of the cartridge 211 is stopped. Under this condition, the shutter 308 finishes moving and the rectangular opening 307 of the cartridge proper 304a is completely open. At this time, the disk 305 housed in the cartridge proper 304a is exposed. Prior to stopping of the cartridge 211, the latch-fit pawl 311, having an elastic body at the top end of the insertion side of the cartridge proper 304a, is expanded to open against the energizing force. Then, the latch-fit pawl 311 engages with the latch-concave portion 304b of the cartridge proper 304a, to prevent the cartridge proper 304a state from falling.

The lever 312 used to slide the shutter 308 is that one of the levers 312 which is on the tip-end side of the cartridge holder 303. The other open/close lever 312 is used to slide the shutter 308 when the cartridge 211 is inserted reversely.

Upon completion of the insertion of the cartridge 211 into the cartridge holder 303, the cartridge turns on the switch 314 provided in the cartridge holder 303. An ON signal generated by the switch 314 causes the motor 322 to start. Then, the pulley 322a is rotated in a specified direction by the shaft of the motor 322, and rotates the worm gear 321h via the belt 321i. Then, the worm wheel gear 321h is rotated, rotating the elastic plate 321f having the pin engaged with the elongated hole 321d formed in the worm wheel 321b.

In this event, the pin 321e protruding from the elastic body 321f, which passes through the semicircular groove 321j of the holder member 321a and engages with the elongated hold 316e formed on the drive plate 306, presses the drive plate 317 in the rotating direction. Then, the drive plate 316 moves along the guide hole 316a formed on the drive plate 316.

Figure 27B:
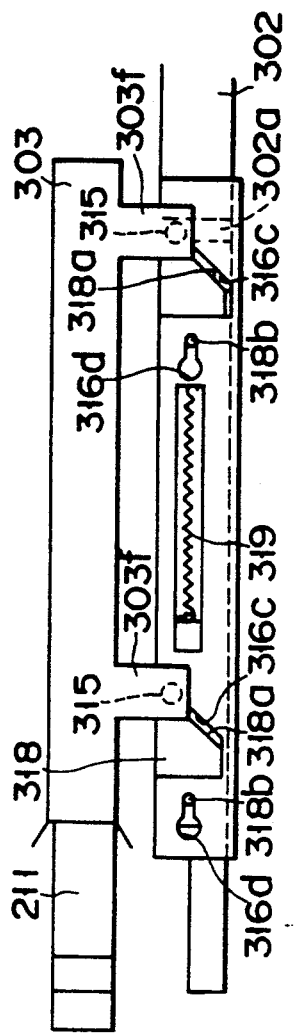

The cartridge holder 303 is moved parallel to the top surface of the base 302 while held by the drive plate 316 until the shaft 315 of the cartridge holder 303 contacts with the butting section 302b formed on the base 302. Then, as is shown in FIGS. 27B and 27A, the shaft 315 is brought into contact with the butting section 302b.

As is shown in FIG. 28A or 29, when moved in the horizontal direction, the shaft 315 moves maintaining a small clearance Δ between it and the notch 302a of the base 302.

Figure 27C:
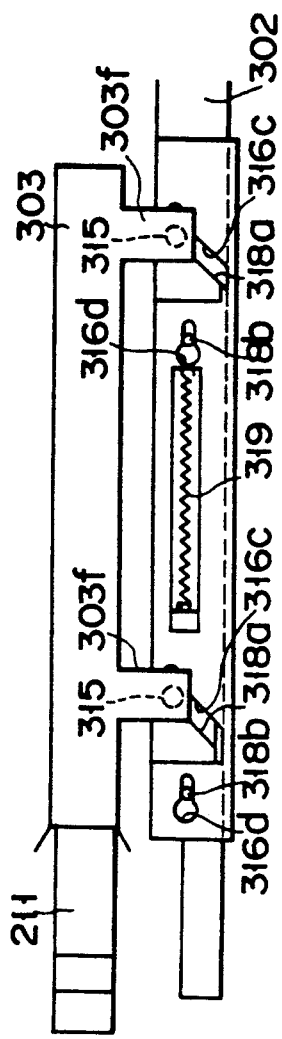

As the drive plate 316 moves along with the auxiliary drive plate 318, against the energizing force of the elastic body 319 interposed between the drive plate 316 and the auxiliary drive plate 318, the shaft 315 is stopped by the wall surface of the latch 302b, and can no longer move. Therefore, the shaft 315 is pressed onto the slope 318a of the auxiliary drive plate 318, disengages from the concave portion 316b of the drive plate 316, and contacts one of the walls of the latch 302b. Then, it makes contact with one of the walls of the latch 302b and moves in the insertion direction, i.e., the vertical direction which is the second direction intersecting with the first direction at right angles. After disengaging from the concave section 316b, the shaft 315 moves, remaining in contact with the wall surface of the latch 302b, and slopes 316c and 318a. That is, as the shaft 315 moves, while squeeze-held between the slope 316a formed on the drive plate 316 and the slope 318a formed on the auxiliary drive plate 318, and as the drive plate 316 moves, the pressure in the vertical direction is applied on the surface of the slope 318, and the reaction force is applied thereto from the surface of the butting section 302b. As a result the shaft 315 is moved downward, as is shown in FIGS. 27C, 28B, and 28C.

As the shaft 315 moves downward, the cartridge 211 contacts the top surface of the base 302, and the cartridge holder 303 travels vertically until the concave section 303c formed in the cartridge holder 303 comes into contact with the top surface of the cartridge 211, as is illustrated in FIGS. 27D and 28D.

If the drive plate 316 moves further after the cartridge holder 303 stops, the slope 316c stops squeeze-holding the shaft 315, whereby a clearance is provided between the slope 316c and the slope 318c, increasing the extension of the elastic body 319. This increases the energizing force exerted to the auxiliary drive plate 318, which presses the cartridge holder 303 downward via the shaft 315. The holder 303, in turn, presses the cartridge 211 against the contacted section formed on the top of the base 302 via the back surface of the concave section 303c of the cartridge holder 303, as is illustrated in FIG. 27D.

During the vertical travelling of the cartridge holder 303, the latch hole 304c formed in the cartridge body 304a engages with a pair of latch pins 302c protruding from the top of the base 302, and positions the cartridge 211 with respect to the base 302. At the same time, the disk 305 in the cartridge 104a is clamped by the turntable 320 installed on the base 302.

When the switch 324 detects the rotating position completion position shown in FIG. 27E, the motor 322 stops the worm wheel 3216.

In this way, the cassette-loading operation completes, and the memory device is ready to record information on or reproduce information from the disk 305 (i.e., a recording medium).

In response to an eject signal, the drive motor 322 starts rotating the driving shaft reversely. This reverse rotation is transmitted to the worm gear 321h via the pulley 322a and belt 321i. As a result of this, the worm wheel 321b meshed with the worm gear 321h is rotated reversely, rotating the elastic plate 321f reversely. The pin 321e protruding from the elastic plate 321 pushes, the drive plate 316 in the reverse direction.

Then, the shaft 315 of the cartridge holder 303 contacts the slope 316c formed on the drive plate 316. The reaction force at the root-end side of the butting section 302b of the base 302 and the pressure applied vertically to the surface of the slope 316c move the shaft 315 upward. The shaft 315 is held in the concave section 316b continuous to the slope 316c, by the energizing force of the elastic body 319 applied via the auxiliary drive plate 318. Meanwhile, the cartridge 211 move from the latch pin 302c protruding from the base 302. At the same time, the disk 305 also leaves the turntable 320. In addition, the drive plate 316 moves the cartridge holder 303 held by the drive plate 316, parallel to the top surface of the base 302. When the switch 324 moves to the root end of the base 302, it detects the rotating position of the worm wheel 321b, and turns off the motor 322.

During the loading operation, the cartridge holder 303 containing the cartridge 211 travels in the horizontal direction, and brings the shaft 315 protruding toward the cartridge holder, into contact with the wall surface of the butting section 302b of the base 302. Then the cartridge 211 travels in the vertical direction to the final loading position. That is, after the cartridge holder 303 is moved in the horizontal direction, it can be moved vertical to the axial direction of the turn table 320 as is shown in FIG. 27A to 27E.

During the unloading operation, the shaft 315 protruding toward the cartridge holder 303 contacts the wall surface of the butting section 302b of the base 302, and travels first in the vertical direction, and then, in the horizontal direction, thus moving the cartridge holder 303 to the discharge position. That is, to 27A after the cartridge holder 303 is moved in the vertical direction, it is moved in a horizontal direction as is illustrated in FIGS. 27E to 27A.

The operation of the front cover open/close unit, which is driven as the loading unit operates, will now be explained.

Figure 22:
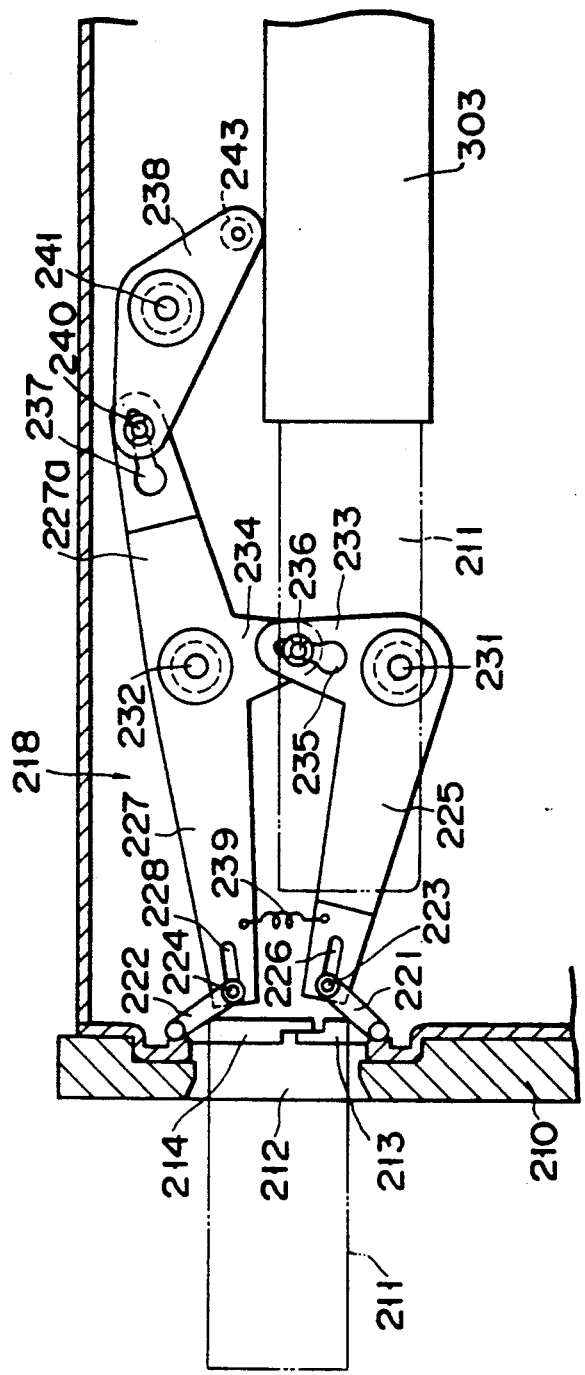
Figure 23:
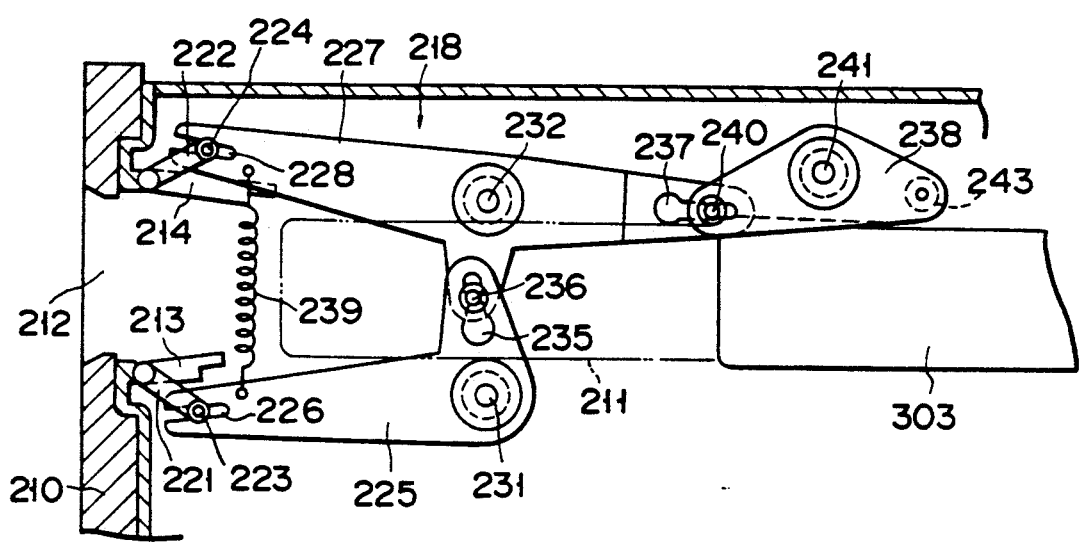
Figure 24:
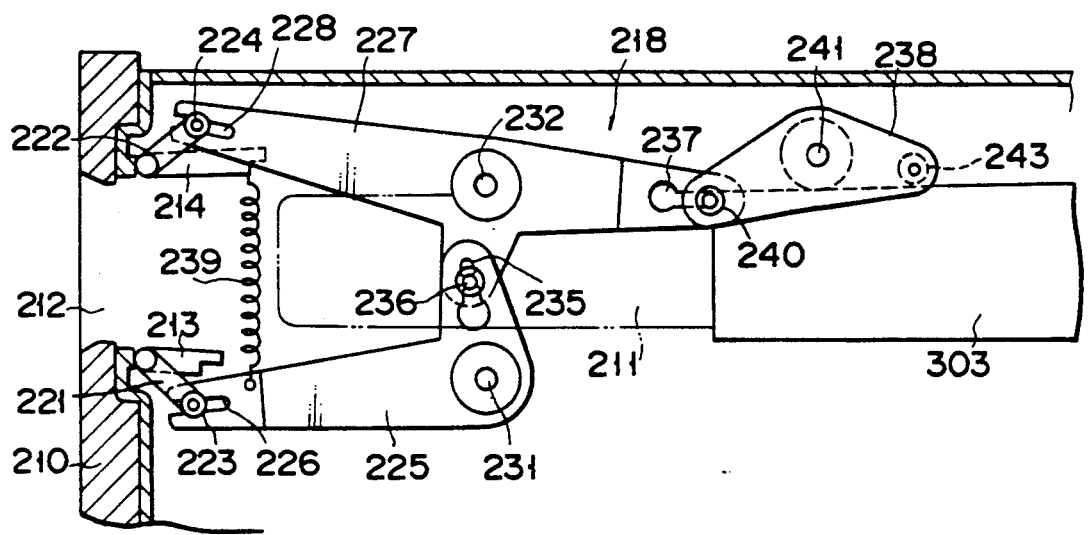

FIG. 22 shows the cartridge 211 loaded in the unit proper 210. Under this condition, the roller 243 of the drive link 238 is not pushed up by the cartridge holder 303. Since the first link 225 and the second link 227 are pulled closer by the tension coil spring 239, the first front cover 213 and the second front cover 214 are completely closed, preventing dust from entering the unit.

Figure 25:
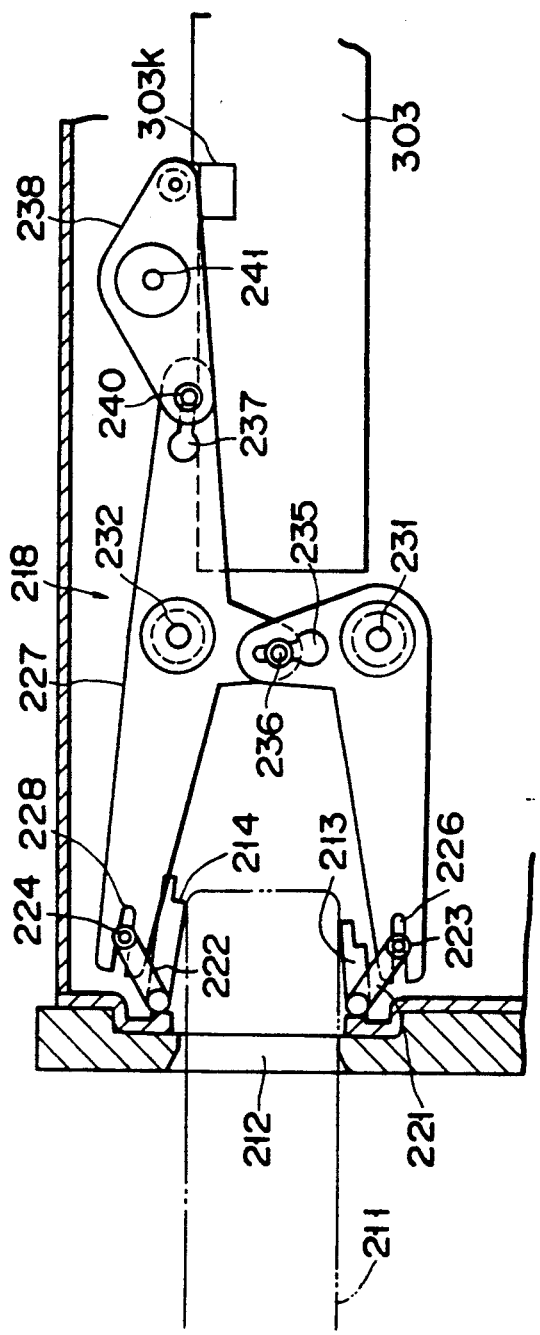

From this condition, the unloading operation proceeds in the order of FIG. 27E→FIG. 27D→FIG. 27C→FIG. 27B→FIG. 27A. At first, the cartridge holder 303 containing the cartridge 211 begins to ascend. It momentarily pushes up, at its top surface, the roller 234 in the drive link 238 of the open/close unit. Consequently, the drive link 238 rotate counterclockwise, causing the latch pin 240 to move downward, and the second link engaged with the pin 240 to rotate clockwise. The first link 225 connected to the second link 227 rotate counterclockwise. The first link 225 and the second link 227 reversely rotate the first lever 221 and the second lever 227, whereby the first front cover 213 and the second front cover 214 are opened. In addition, when the cartridge holder 303 ascends, the roller 243 further ascends and opens the front covers 213 and 214 completely. The slot 212 is therefore opened as shown in FIG. 25.

Thereafter, the cartridge holder 303 starts moving in the horizontal direction. The roller 243 rolls on the top surface of the cartridge holder 303 and maintains its position. The front covers 213 and 214 are held completely open.

When the cartridge holder 303 reaches the horizontal-transportation end position (the position shown in FIG. 27A), the roller 243 is located at the upper part of the position of the notch 103k made in the top surface of the cartridge holder 303. Then, it contacts the top surface of the cartridge 211 loaded in the cartridge holder 303. Now, the external edge of the cartridge protrudes outside, from the slot 212.

Then, when the cartridge 211 protruding from the slot 212 is withdrawn, the roller 243 fits into the notch 303k formed in the top surface of the cartridge holder 303. The drive link 238 rotates clockwise. The latch pin 240, in turn, moves upward and rotates the second link 227, which is engaged with the pin 240, counterclockwise. The first link 225, connected to the second link 227, rotates clockwise. The first link 225 and the second link 227 rotate the levers 221 and 222, whereby the first front cover 213 and the second front cover 214 move outward, reversely to each other, and are closed. The first front cover 213 and the second front cover 214 are completely closed, preventing the entry of dust from outside into the unit.

On the other hand, to load the cartridge into the unit, as is indicated by the two-dot, one-dash lines in FIG. 25, the front end of the cartridge 211 presses open the front covers 213 and 214, and the cartridge is inserted into the cartridge holder 303. Then, when the cartridge 211 is completely inserted in the cartridge holder 303, the loading operation described above takes place. In this event, the first front cover 213 and the second front cover 214 operate in the reverse order, that is, in the order of FIGS. 24, 23, and 22, and completely close.

In this way, as the cartridge holder 303 operates, the front cover open/close mechanism 218 opens and closes the front covers 213 and 214, normally closing the covers 213 and 214 as long as the cartridge 211 is set within the unit or located outside the unit.

As is shown in FIG. 19B, the rotation radius $R_1$ of the first front cover 213 is smaller than that radius $R_2$ of the second front cover 214. Hence, when the front covers 213 and 214 are closed, in the same phase, by the front cover open/close mechanism 218 as described above, the tip of the first front cover 213 passes the intersection section P of the loci of the tip ends of the front covers 213, and 214 before the tip end of the second front cover 214 passes. Consequently, the front covers accurately close, without causing reverse overlap of the tip ends or without hitching in the course of closing. As the front covers open, they operate reversely to accurately open, without hitching in the course of opening.

FIG. 19A shows two front covers 213 and 214 having the same rotation radius. Compared to this case, the rotation radius $R_1$ of the first front cover 213 can be smaller than that $R_2$ of the second front cover 214 as shown in FIG. 19B. Consequently, the locus of the first front cover 213 is small, and the horizontal transportation distance of the cartridge holder 303 holding the cartridge 211 can be shortened by difference 1. In other words, the length in the horizontal transportation direction of the cartridge holder 303 can be reduced.

Figure 33:
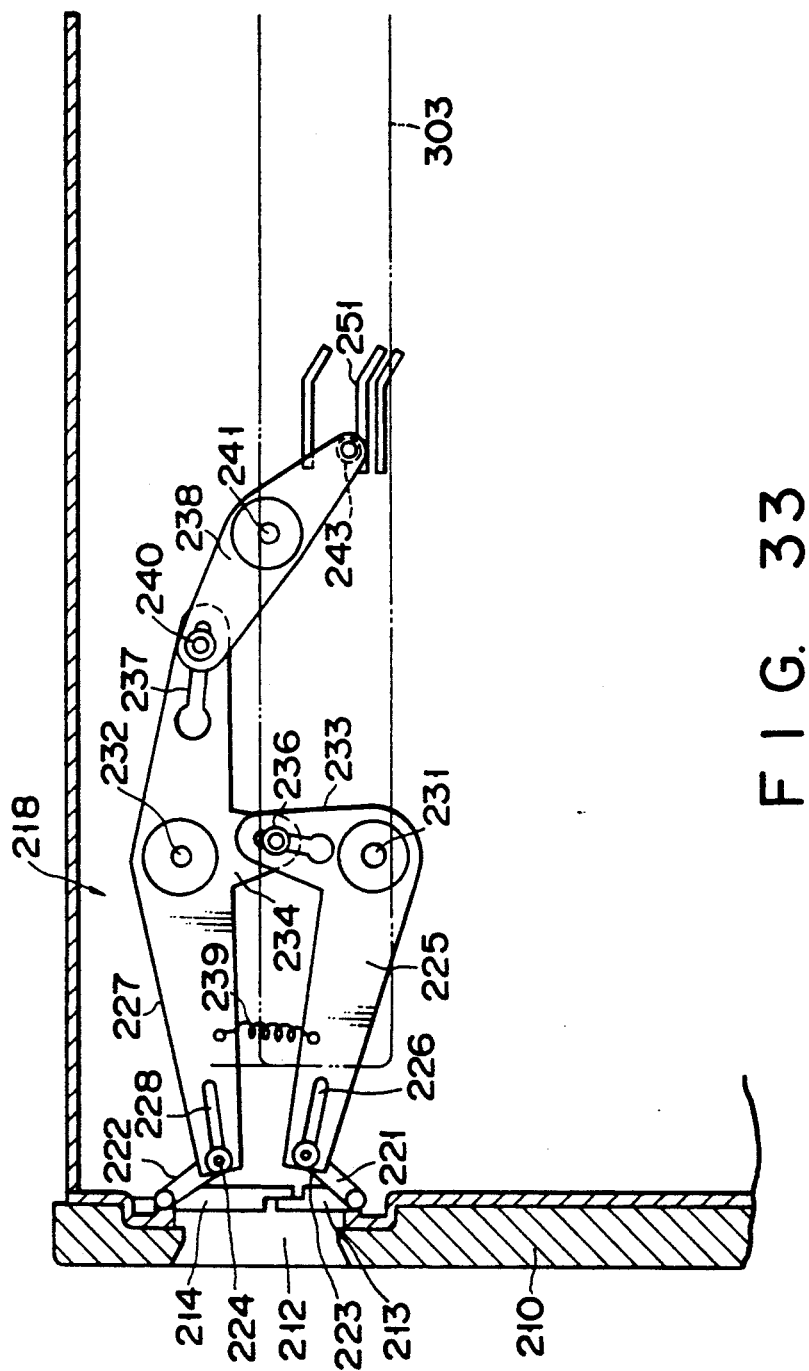

FIGS. 33 and 34 show the ninth embodiment of the present invention. In this embodiment, the roller 243 of a front cover open/close mechanism 218 is not supported on the top surface of the cartridge holder 303. Instead, a plate 251 is attached to the side of the cartridge holder 303, for supporting the roller 243. The ninth embodiment is identical to the first embodiment in other respect.

Since Receiving the roller 243 of the front cover open/close mechanism 218 rests on the plate 251 attached to the side of the cartridge holder 303, not on the top surface of the cartridge holder 303, the plate 251 can take various vertical positions contributing to reduction in size in the vertical direction of the unit.

Figure 35:
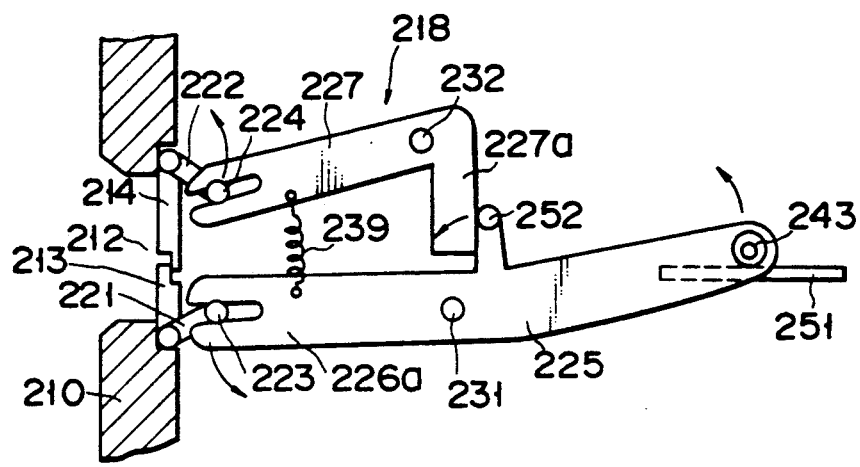
FIGS. 35 and 36 are a side view and a plan view, respectively of the cover-opening and -closing mechanism according to a tenth embodiment of the present invention.
Figure 36:
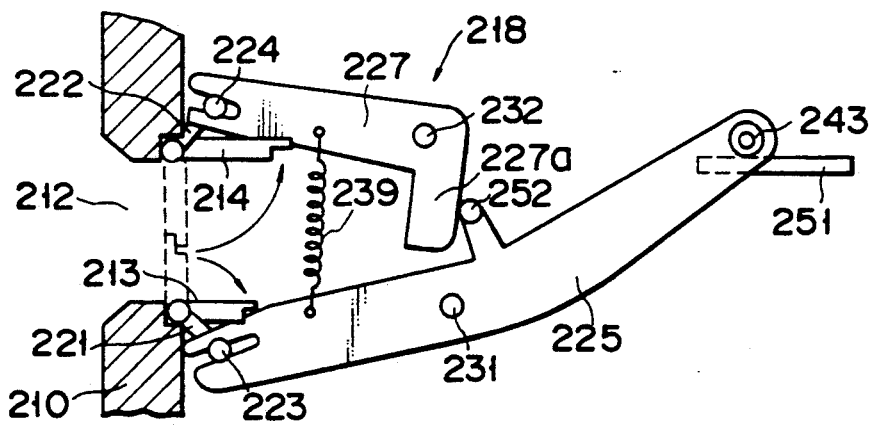

FIGS. 35 and 36 show the tenth embodiment of the present invention. In this embodiment, a roller 243 is connected to the other end of the first link 225 of a front cover open/close mechanism 218. This roller 243 rests on the top surface of a cartridge holder 303 or on a plate 251. A second link 227 is formed in a L form as a whole. A pin 252 protrudes from the rotatably moving end of the first link 225, to engage with the other end 227a of the second link 227.

When the cartridge holder 303 which ascends to travel during loading pushes up the roller 243, the first link 225 rotates counterclockwise, to rotate the second link 227 clockwise via the pin 252. Hence, as in the embodiments described above, front covers 213 and 214 are opened. The same operation is carried out to close the front covers.

In the tenth embodiment, the front cover open/close mechanism can be formed of less components.

FIGS. 37 and 38 show the eleventh embodiment of the present invention. In this embodiment, the fulcrum 255 of a second link 227 is provided at the rear end of the link 227, and the roller 243 contacting the cartridge holder 303 is located at the middle of the second link 227. In addition, at the rear end of the first link 225, a pin 257, which is inserted in the elongated hole 256 made in the second link 227, connects the links 225 and 227.

Even in this configuration, the second link 227 is rotated clockwise by the roller 243 pushed up by the cartridge holder which is ascending during the loading operation, and rotates the first link 225 counterclockwise via the pin 257. With this operation, as in the embodiments described above, the front covers 213 and 214 are opened. The mechanism operates in the same way to close the front covers. Needless to say, the front covers 213 and 214 are held closed by the energizing force of a tension coil spring 239.

Even with the eleventh embodiment, the front cover open/close mechanism 218 can be made of less components.

The present invention is not limited to the above embodiments. This invention can be applied to various information processor systems, including optical ones and magnetic ones.

As described above, according to the other aspect of the present invention, the rotation radius of one of the two front covers is smaller than that of the other front cover, so that the front covers can be accurately opened and closed without interfering with each other. In addition, the front cover open/close mechanism can be simplified. Furthermore, the locus range of the front cover having the smaller rotation radius is smaller, permitting reduction in the size of the unit.

According to the other aspect of the present invention, since the travelling of the cartridge holder in the direction intersecting with the cartridge insertion direction is utilized to drive the front cover open/close mechanism, no loss of drive force is made, and reliable operation is ensured. This configuration can be applied to any units using the regular cartridge transportation system. Furthermore, this does not need any special driving source such as a solenoid, providing economical units having drive means of simple structure.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. In a drive unit for an optical memory device, which includes a housing for receiving therein a recording medium, an optical head for reading out data from said recording medium, first drive means for linearly moving said optical head, second drive means for rotatably driving said recording medium, and a drive circuit board for controlling said first and second drive means, the improvement comprising:

sealing means arranged inside of said housing and defining an area covering in a nearly sealed condition said recording medium, said optical head, said first drive means, and only a part of a rotating shaft of said second drive means, said area covered by said sealing means having an internal space;

first and second apertures in said housing;

at least said drive circuit board is arranged in a space external of the area covered by said sealing means, at least said drive circuit board being arranged in a space between a surface of said sealing means and an inner surface of said housing;

said sealing means having an opening at a section thereof corresponding to a slot in a front panel of said housing; and means for opening and closing said opening as a recording medium is loaded or unloaded via said slot wherein when said opening is open, air flow via said slot into the internal space of the area covered by said sealing means as well as into said housing external of the area covered by said sealing means are both allowed, and when said opening is closed, only the air flow into the internal space of the area covered by said sealing means is prevented.

2. The drive unit of claim 1, wherein said second drive means includes a spindle motor.

3. The drive unit of claim 1, wherein:

said drive circuit board includes first and second circuit boards for controlling said first and second drive means; and said first and second circuit boards are mounted in said housing to allow outside air introduced via said apertures in said housing to pass between said first and second circuit boards.

4. The drive unit of claim 1, wherein said opening in said sealing means comprises an air passage located along a rear surface of the front panel and opposing said slot.

5. The drive unit of claim 1, wherein:

said housing includes a front cover unit, a rear cover unit, and a deck unit; and said sealing means closely engages with said front cover unit, said rear cover unit, and said deck unit to encircle said first drive means.

* * * * *